US011953176B2

(12) United States Patent
Khalili

(10) Patent No.: US 11,953,176 B2
(45) Date of Patent: Apr. 9, 2024

(54) RECESSED CONCRETE LUMINAIRE AND METHOD OF INSTALLATION THEREOF

(71) Applicant: Brilliant Factors Inc., Markham (CA)

(72) Inventor: Hooman Khalili, Markham (CA)

( * ) Notice: Subject to any disclaimer, the term of this patent is extended or adjusted under 35 U.S.C. 154(b) by 0 days.

(21) Appl. No.: 17/858,179

(22) Filed: Jul. 6, 2022

(65) Prior Publication Data

US 2023/0167956 A1 Jun. 1, 2023

Related U.S. Application Data

(60) Provisional application No. 63/283,341, filed on Nov. 26, 2021.

(51) Int. Cl.
*F21S 8/02* (2006.01)
*F21V 21/04* (2006.01)

(52) U.S. Cl.
CPC ................ *F21S 8/02* (2013.01); *F21V 21/04* (2013.01)

(58) Field of Classification Search
CPC .............. F21S 8/02; F21S 8/026; E04B 9/006
See application file for complete search history.

(56) References Cited

U.S. PATENT DOCUMENTS 1,853,321 A * 4/1932 Rogers ...................... B64F 1/20 362/153.1
3,087,053 A * 4/1963 Jones ...................... F21V 17/00 362/147
3,099,404 A * 7/1963 Schwartz .................. F21S 8/02 220/3.7
3,364,635 A * 1/1968 Guggemos ............. H02G 3/185 174/45 R
3,962,675 A * 6/1976 Rowley ..................... F21S 8/00 362/101

(Continued)

FOREIGN PATENT DOCUMENTS

DE 4312661 * 10/1994 ............... H02G 3/20
DE 19735013 * 11/1998 ................ F21S 8/02

(Continued)

OTHER PUBLICATIONS

English Machine Translation of DE 4312661 provided by Espacenet (Year: 1994).*

*Primary Examiner* — Zheng Song
(74) *Attorney, Agent, or Firm* — BERESKIN & PARR LLP/S.E.N.C.R.L., s.r.l.

(57) ABSTRACT

Various embodiments herein relate to a recessed concrete luminaire and a method of installation thereof. In at least one embodiment there is provided a recessed concrete luminaire comprising: a junction box defining a housing for retaining at least one light emitter and corresponding electrical hardware components; and a concrete structure secured to the junction box, the concrete structure having a first outer side and an opposed second inner side and at least one opening extending between the first and second sides, wherein the junction box is connected to the second side; and wherein, in an installed position, the recessed luminaire is irremovably embedded inside of a recess formed inside of a concrete mounting structure, and the first side of the concrete structure is exposed outside of the recess and is flush with a surface of the concrete mounting structure.

20 Claims, 27 Drawing Sheets

(56) References Cited

U.S. PATENT DOCUMENTS

| | | | | |
|---|---|---|---|---|
| 4,382,274 A * | 5/1983 | De Backer | E01F 9/559 | 362/244 |
| 4,396,972 A * | 8/1983 | Kaneko | B64F 1/20 | 362/184 |
| 5,778,625 A * | 7/1998 | Druffel | H02G 3/20 | 52/576 |
| 5,908,263 A * | 6/1999 | Conners | E01F 9/559 | 362/153.1 |
| 6,207,894 B1 * | 3/2001 | Reiker | E04B 9/006 | 52/220.8 |
| 7,347,606 B1 * | 3/2008 | Patten | F21V 15/04 | 362/217.05 |
| 2006/0291197 A1 * | 12/2006 | Patti | F21V 21/04 | 362/153.1 |
| 2010/0084185 A1 * | 4/2010 | Barmucha | F21S 8/033 | 174/542 |
| 2014/0185291 A1 * | 7/2014 | Gotay | F21S 8/02 | 362/249.01 |

FOREIGN PATENT DOCUMENTS

| | | | | |
|---|---|---|---|---|
| DE | 102020124439 | * | 3/2022 | F21V 21/04 |
| EP | 0662742 B1 | | 1/1997 | |
| EP | 1136747 | * | 9/2001 | F21V 29/60 |

* cited by examiner

RECESSED CONCRETE LUMINAIRE AND METHOD OF INSTALLATION THEREOF

CROSS-REFERENCE TO RELATED PATENT APPLICATION

This application claims priority from U.S. Provisional Application No. 63/283,341 filed on Nov. 26, 2021, the entire contents of which are hereby incorporated by reference.

TECHNICAL FIELD

Various embodiments are described herein that relate to light fixtures and luminaires, and in particular, to a recessed concrete luminaire and a method of installation thereof.

INTRODUCTION

The following is not an admission that anything discussed below is part of the prior art or part of the common general knowledge of a person skilled in the art.

Luminaires and light fixtures are common place in residential and commercial building settings. In many cases, luminaires may be recessed into walls, beams, floors, etc. such as to allow the luminaire to blend in with the environment in an aesthetically pleasing manner. A challenge, however, is encountered in recessing luminaires into cured concrete structures.

SUMMARY OF VARIOUS EMBODIMENTS

The following introduction is provided to introduce the reader to the more detailed discussion to follow. The introduction is not intended to limit to define any claim or as yet unclaimed invention. One or more inventions may reside in any combination or sub-combination of elements or process steps disclosed in any part of this document including its claims and figures.

In accordance with a broad aspect of the teachings herein, there is provided a recessed concrete luminaire comprising: (a) a junction box defining a housing for retaining at least one light emitter and corresponding electrical hardware components; and (b) a concrete structure secured to the junction box, the concrete structure having a first outer side and an opposed second inner side and at least one opening extending between the first and second sides, wherein the junction box is connected to the second side; and wherein, in an installed position, the recessed luminaire is irremovably embedded inside of a recess formed inside of a concrete mounting structure, and the first side of the concrete structure is exposed outside of the recess and is flush with a surface of the concrete mounting structure, and the at least one light emitter is accessible from the at least one opening of the first side of the concrete structure.

In some embodiments, the concrete structure is reinforced by one or more of steel wire and polypropylene fiber for increased structural integrity.

In some embodiments, the recessed light fixture further comprises one or more retention mechanisms connected to the concrete structure, the retention mechanisms securing the luminaire inside the concrete mounting structure in the mounted position.

In some embodiments, the one or more retention mechanisms comprise steel brackets.

In some embodiments, the opening has a moldable profile shape.

In some embodiments, the profile is one or more of a frustoconical profile, a stepped profile a bell shape or a cylindrical profile.

In some embodiments, the junction box further comprises one or more punch-out holes for receiving external wiring, and in the installed position, the punch-out holes are aligned with an electrical conduit layer inside the concrete mounting structure.

In some embodiments, the recessed light fixture further comprises a reflector positioned inside of the opening of the concrete structure.

In some embodiments, a shape of the reflector is complementary to the profile of the opening in the concrete portion so that the at least one opening can receive the reflector.

In some embodiments, the at least one opening comprises two openings.

In some embodiments, the concrete structure has a lateral surface that extends between the inner and outer sides, and a cove groove extends into the lateral surface along the outer side, the cove groove being configured to receive a fillable material and to act as a cold joint in the mounted position.

In accordance with another broad aspect of the teachings herein, there is provided a method for installing a recessed concrete luminaire comprising: securing the luminaire to a formwork layer of a concrete framework structure, the luminaire comprising: a junction box defining a housing for retaining at least one light emitter and corresponding electrical wiring; and a concrete structure secured to the junction box, the concrete structure having a first outer side and an opposed second inner side and at least one opening extending between the first and second surfaces, wherein the junction box is connected to the second inner surface, and the at least one opening is aligned with the at least one hole in the formwork layer; applying structural elements to the concrete framework structure; pouring concrete material in the concrete framework structure to form a concrete mounting structure; wherein in an installed position, the luminaire is irremovably embedded inside of a recess formed inside of the concrete mounting structure, and the first side of the concrete structure is exposed outside of the recess and is flush with a surface of the concrete mounting structure, and the at least one light emitter is accessible from the at least one opening of the first side of the concrete structure.

In some embodiments, the formwork layer comprises plywood.

In some embodiments, the after pouring the concrete material, the formwork layer is removed.

In some embodiments, prior to securing the luminaire to the formwork layer, the method further comprises: installing electrical components inside a junction box cavity In some embodiments, prior to applying structural elements to the concrete framework structure, the method further comprises: connecting electrical conduits to the junction box via punch-out holes on the junction box, and securing a top lid of the junction box in the closed position.

In some embodiments, applying the structural elements comprises installing one or more reinforcement bar layers.

In some embodiments, installing the reinforcement bar layers comprises bending one or more reinforcement bars to avoid interference with the luminaire.

In some embodiments, installing the reinforcement bar layers comprises cutting one or more of the reinforcement bars to avoid interference with the luminaire, and installing additional one or more additional reinforcement bars.

In some embodiments, the concrete framework structure is in one of a vertical or horizontal orientation.

Other features and advantages of the present application will become apparent from the following detailed description taken together with the accompanying drawings. It should be understood, however, that the detailed description of the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiments, and which are now described. The drawings are not intended to limit the scope of the teachings described herein.

Figure 1A:
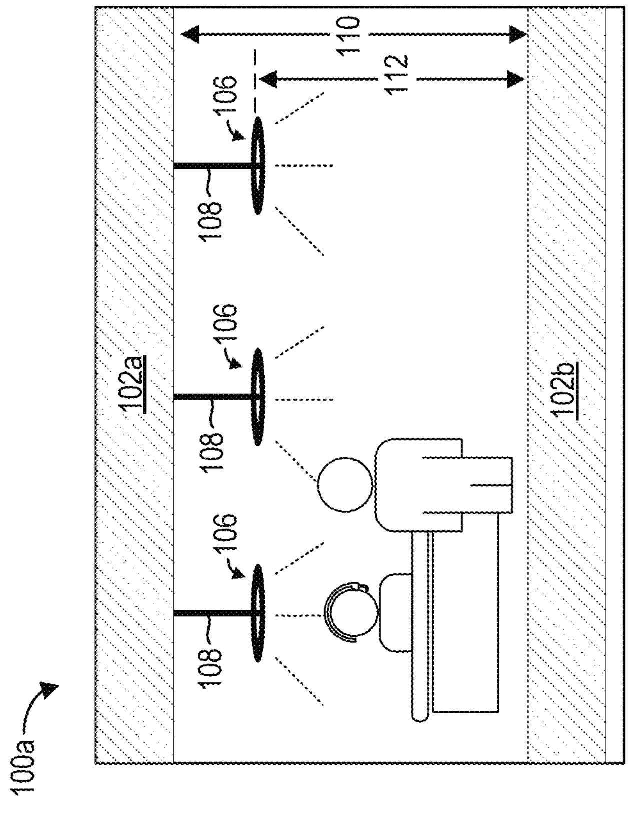
FIG. 1A illustrates an example environment that includes one or more suspended luminaires.

Further aspects and features of the example embodiments described herein will appear from the following description taken together with the accompanying drawings.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (e.g., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

As used herein and in the claims, a first element is said to be "received" in a second element where at least a portion of the first element is received in the second element unless specifically stated otherwise.

Some elements herein may be identified by a part number, which is composed of a base number followed by an alphabetical or subscript-numerical suffix (e.g. 112*a*, or $\mathbf{112}_1$). Multiple elements herein may be identified by part numbers that share a base number in common and that differ by their suffixes (e.g. $\mathbf{112}_1$, $\mathbf{112}_2$, and $\mathbf{112}_3$). All elements with a common base number may be referred to collectively or generically using the base number without a suffix (e.g. 112).

It will be understood that reference herein to "top", "bottom" and "lateral" are relative terms used for ease of description and that the elements, components, objects, etc described herein may be provided in any suitable orientation.

Luminaires are often recessed into various mounting structures (e.g., drywall) by drilling holes into these structures such as to accommodate the luminaires. As stated in the background, however, there are number of challenges involved in recessing luminaires into exposed concrete structures. For example, it is often not possible for installers to drill holes into the exposed concrete structures after the concrete has cured. This is because, once the concrete structure is cured, drilling holes into the concrete may compromise the structural integrity of the concrete structure. To this end, extensive structural analysis must be conducted before installers are given clearance or approval to embed luminaires into a concrete surfaces.

In view of the above, light installers are often left with little option but to suspend luminaires from concrete ceilings (e.g., rather than embedding luminaires into the concrete structure), or otherwise externally attaching luminaires to exposed concrete walls, beams, floors, slabs etc as the case may be. For example, FIG. 1A shows an example environment 100*a* which includes one or more luminaires 106 that are suspended from a concrete ceiling 102*a*, e.g., via cables 108. The environment 100*a* may correspond, for example, to a residential or commercial building.

There are several drawbacks, however, to suspending luminaires from concrete structures as shown in FIG. 1A. For example, installing external luminaires may detract from the overall aesthetic and modern-look of the surrounding space.

Additionally, installing external luminaires may make it challenging for building designers to adhere to strict buildings codes that regulate minimum vertical clearance in building structures. In particular, where a luminaire 106 is suspended from a concrete ceiling 102*a*, the vertical room clearance is reduced, and spans only a height 112 between the suspended luminaire 106 and the floor 102*b*. To overcome this problem, designers must increase the room height 110, e.g., between the ceiling 102*a* and the floor 102*b*, such that the clearance distance 112 is in compliance with building code regulations. However, increasing, rather than decreasing, the floor-to-ceiling height 110 presents particular challenges for designers who desire to add more stories to a building while maintaining low construction costs. In many cases, building designers shy away from installing luminaires and opt for alternative lighting solutions, such as floor lamps.

In view of the foregoing, embodiments provided herein generally relate to a recessed concrete luminaire and a method of installation thereof. The disclosed embodiments may allow embedding of luminaires into exposed concrete structures that include, by way of non-limiting examples, concrete support beams, concrete floors, various types of concrete slabs and pre-caste structures. The exposed concrete may be located in a variety of locations including, not only residential and commercial buildings, but bridges, tunnels as well as any other location where low maintenance light fixtures are required. In at least one embodiment, the recessed concrete luminaires are installed in concrete structures during construction such that the luminaires are permanently (or irremovably) embedded into the concrete structure. In particular, this avoids problems associated with drilling holes into cured concrete, as discussed previously.

Figure 1B:
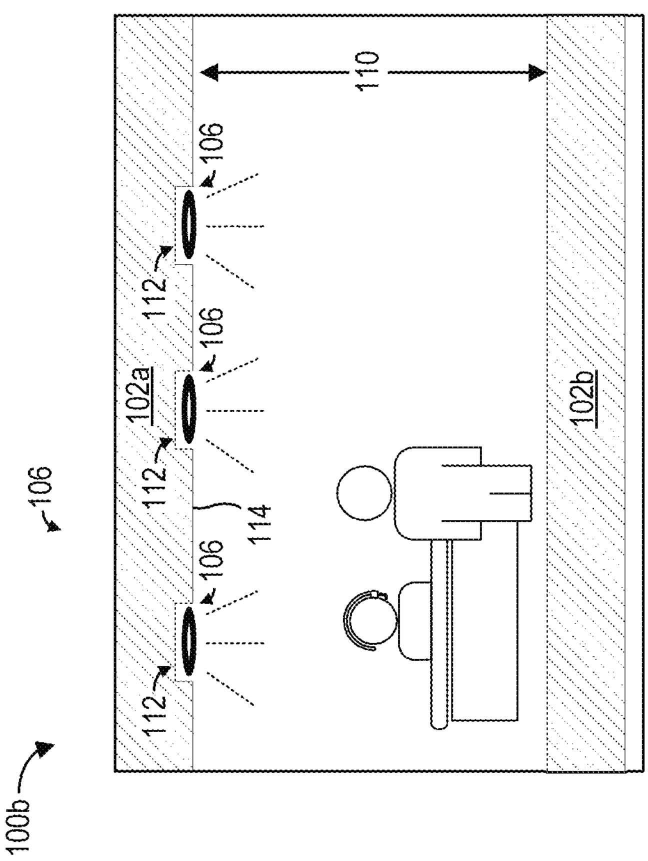
FIG. 1B illustrates an example environment that includes one or more recessed concrete luminaires, in accordance with the teachings provided herein.

FIG. 1B illustrates an example environment 100*b* that includes one or more recessed concrete luminaires, in accordance with the teachings provided herein.

As shown, the recessed concrete luminaires 106 may be embedded into recesses 112 formed in exposed concrete (e.g., ceiling 102*a*) with little or no projection from the concrete structure surface 114. By recessing the luminaires 106 into the exposed concrete, the luminaires 106 may blend more seamlessly with the environment 100*b* such as to provide enhanced aesthetics and a more modern look. Additionally, owing to the recessing, the concrete recessed luminaires 106 do not contribute to reducing the maximum vertical clearance in a room or building story.

General Overview of Recessed Concrete Luminaire

Reference is now made concurrently to FIGS. 2 to 4, which illustrate various views of a concrete recessed luminaire 200, in accordance with embodiments provided herein.

Figure 2A:
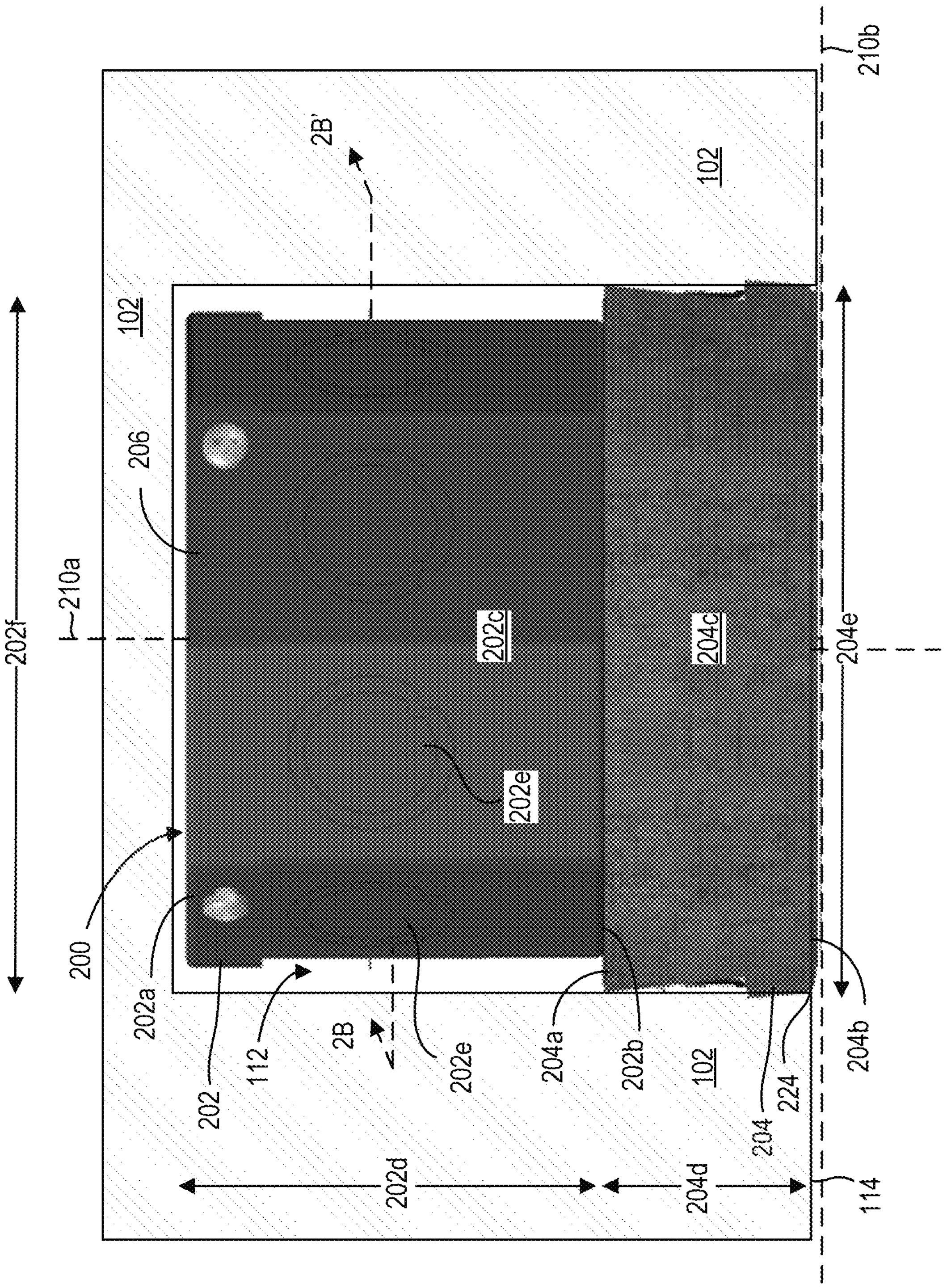
FIG. 2A is an example embodiment a recessed concrete luminaire.
Figure 2B:
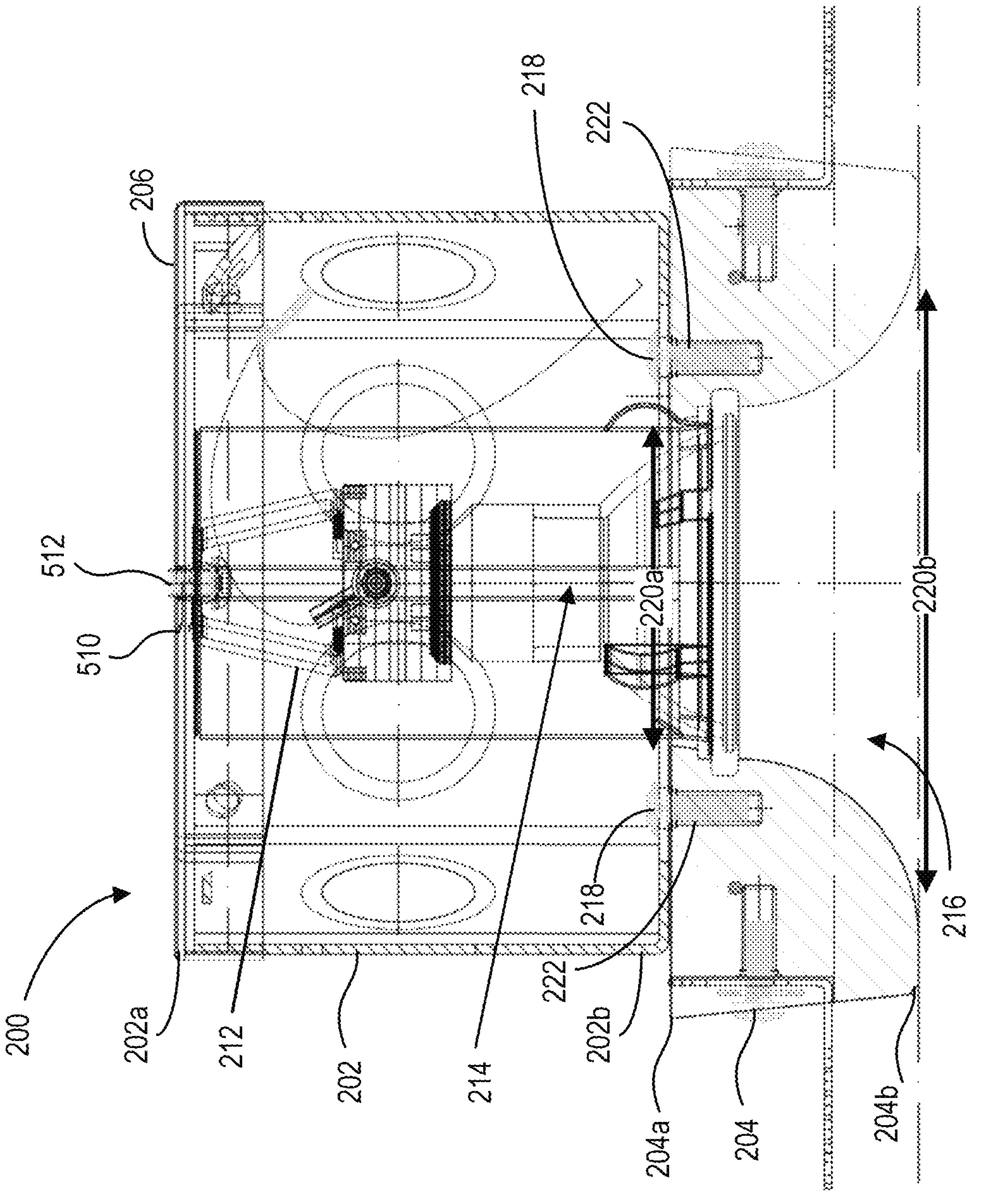
FIG. 2B is a cross-sectional view of the luminaire of FIG. 2A, taken along the section line 2B-2B' of FIG. 2A.

As shown best in FIGS. 2A and 2B, the luminaire 200 may generally include two connected components: (a) an electrical junction box 202, and (b) a base structure 204.

At a general level, junction box 202 may house various electrical hardware components 212 (e.g., heat sinks, electrical wiring, sockets, etc.) as well as a light emitter 214 (e.g., a light bulb). The electrical junction box 202 is coupled, from a bottom side 202*b*, to the base structure 204.

Base structure 204 includes a light passage opening 216 through which light, emitted by the light emitter 214, may pass through to illuminate a surrounding environment. In various embodiments, the base structure 204 is generally manufactured using a moldable material so as to control the shape or profile of the light passage opening 216 contained therein. However, once molded and combined, the base structure and the luminaire are generally fixed in shape. In various embodiments, the base structure 204 is a concrete structure.

In some other embodiments, rather than being a concrete structure, the base structure 204 may be manufactured from various natural or engineered stones. For instance, these may include carved natural stones such as granites, basalts, limestones and marbles. Moldable engineered stone may include, for example, quartz (e.g., a quartz structure manufactured from 90% quartz and the rest being resins and/or polymer). In some cases, natural stone crystals are blended, molded and heated to produce the structure 204.

For ease of explanation, the remaining disclosure will refer to the base structure 204 as being a concrete structure or concrete base structure.

As provided in greater detail, and as best shown in FIG. 2A, in an installed position, the luminaire 200 is completely recessed into the concrete mounting structure 102. In this position, only a bottom surface 204*b* of the concrete structure 204 is exposed outside the concrete mounting structure 102 and is otherwise substantially flush with the exposed concrete surface 114. To this end, the use of a concrete structure 204 that is flush with the surrounding exposed concrete surface 114 allows the recessed luminaire 200 to blend in with the surrounding concrete mounting structure 102 in an aesthetically pleasing manner. In other embodiments, where the base structure is manufactured from stone, the stone can be harmonized to the stone materials installed, e.g., in the interior of the buildings such as stone flooring tiles, stone wall tiles, stone vanity, countertop, etc.

Figure 2C:
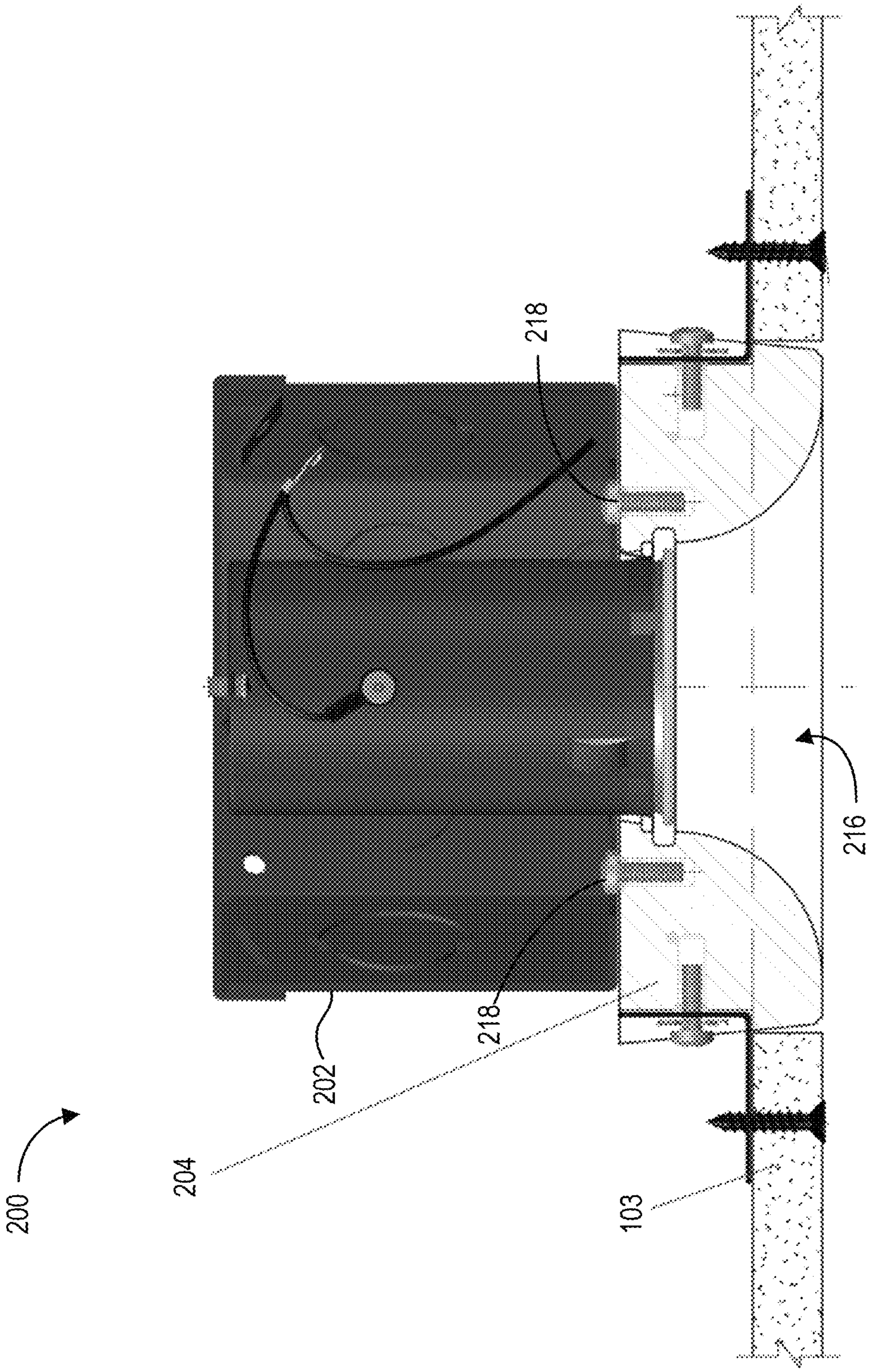
FIG. 2C is an example embodiment a recessed concrete luminaire installed in a drywall panel.

In at least some embodiments, as best shown in FIG. 2C, the luminaire 200 can be installed in drywall 103 (e.g., drywall gypsum boards). For example, in some cases, the luminaire 200 may be installed in drywall boards having a ½" or ⅝" thickness. In some example cases, the concrete luminaire 200 may be installed in drywall in environments where other concrete luminaires have been installed in exposed concrete structures such as to provide harmony throughout the environment. The junction box 202 and the concrete structure 204 are now explained in greater detail herein.

Electrical Junction Box

As explained, junction box 202 houses a variety of electrical hardware components 212 (e.g., heat sinks, electrical wiring, sockets, etc.) for operating a light emitter 214, and may also house the light emitter 214 (FIG. 2B). In some cases, junction box 202 may also house a snap-in barrier 304 (FIGS. 2B and 14), which can separate between the light emitter 214 and other electrical wiring inside junction box 202.

Junction box 202 may be made of any suitable material. In at least one embodiment, the junction box 202 is manufactured of a thick noncorrosive material, and may be designed to be water tight to provide water ingress protection.

Figure 4A:
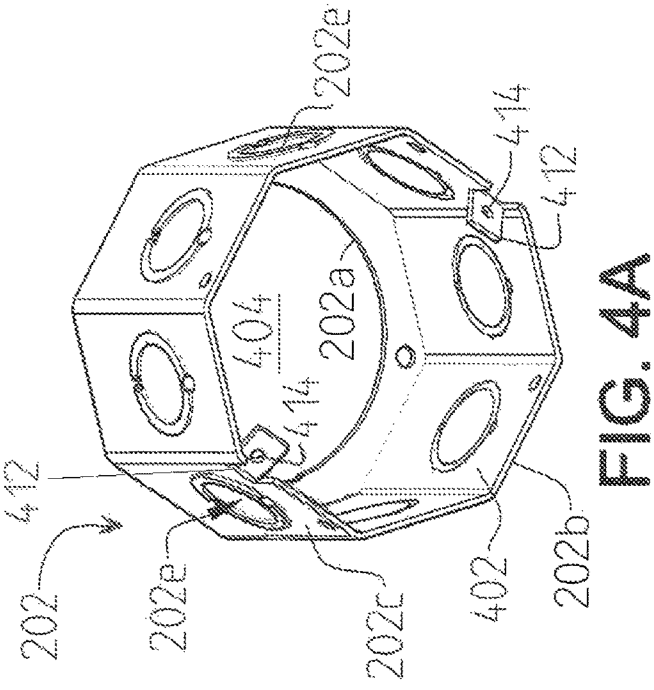
FIG. 4A is a bottom up perspective view of an example electrical junction box.
Figure 4B:
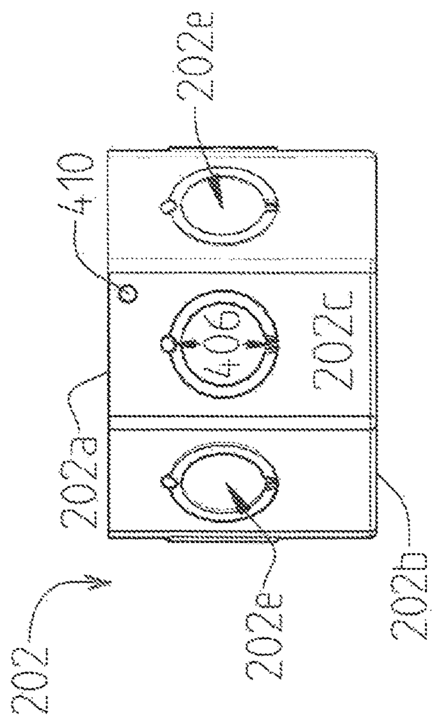
FIG. 4B is an elevation view of the electrical junction box of FIG. 4A.
Figure 6B:
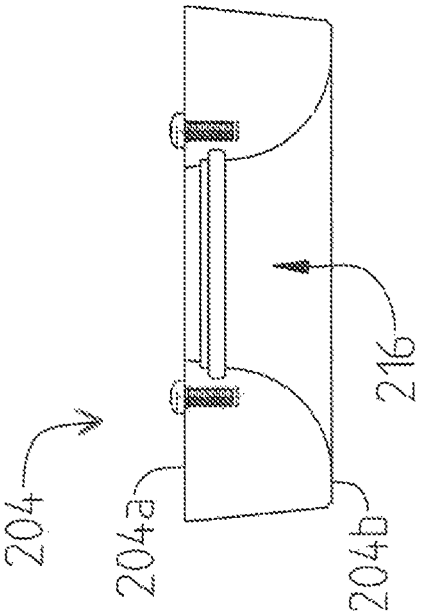
FIG. 6B is a cross-sectional view of the concrete structure of FIG. 6A, taken along the section line 6B-6B' of FIG. 6A.
Figure 6D:
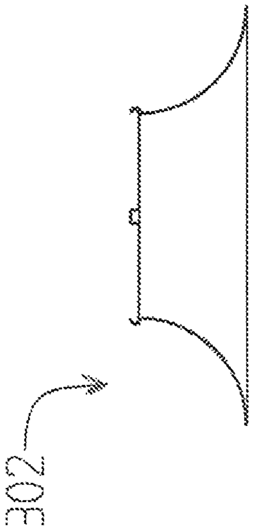
FIG. 6D is an elevation view of the reflector of FIG. 6C.
Figure 6A:
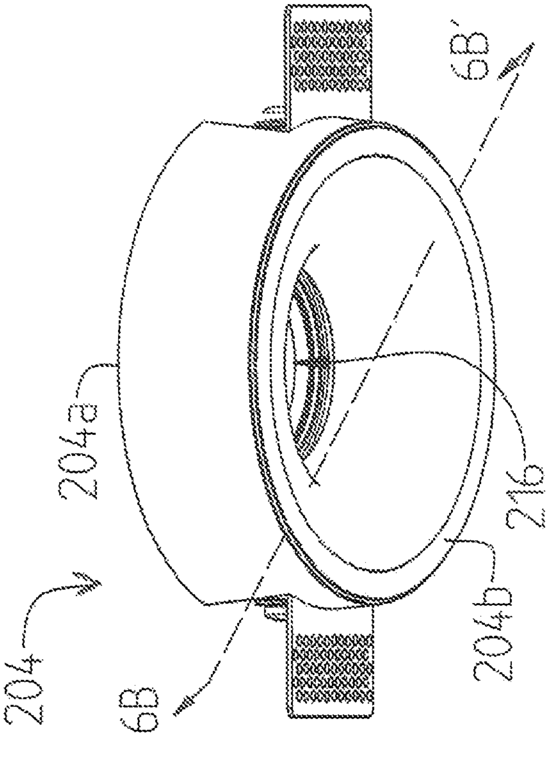
FIG. 6A is a perspective view of a concrete structure, according to some example embodiments.
Figure 6C:
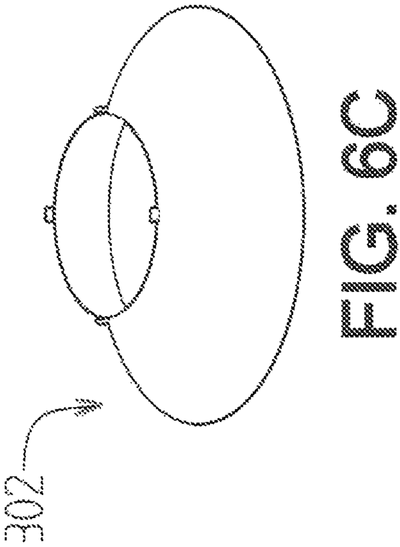
FIG. 6C is a perspective view of an example embodiment of a reflector that is compatible with the concrete structure of FIG. 6A.
Figure 7A:
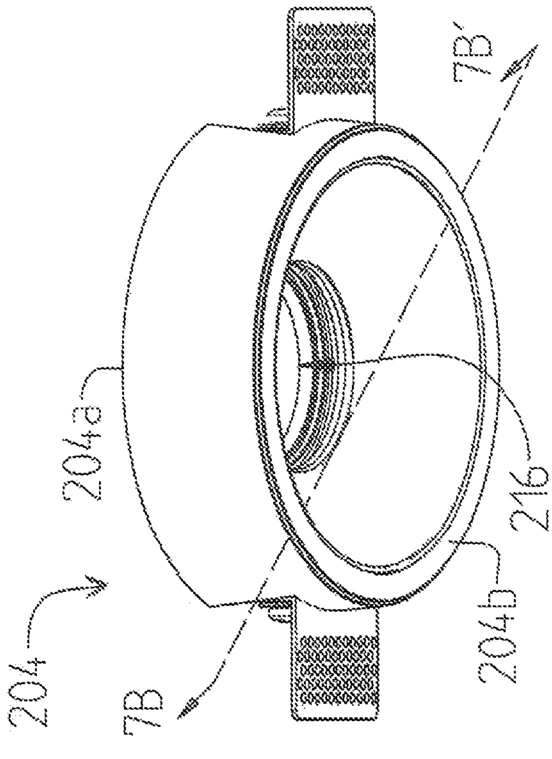
FIG. 7A is a perspective view of a concrete structure, according to some other example embodiments.
Figure 7B:
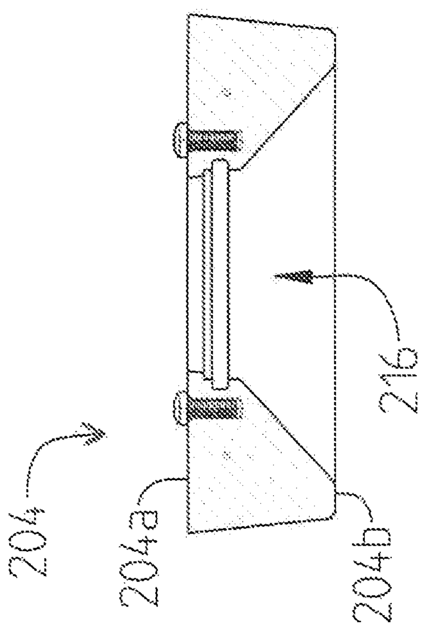
FIG. 7B is a cross-sectional view of the concrete structure of FIG. 7A, taken along the section line 7B-7B' of FIG. 7A.
Figure 7C:
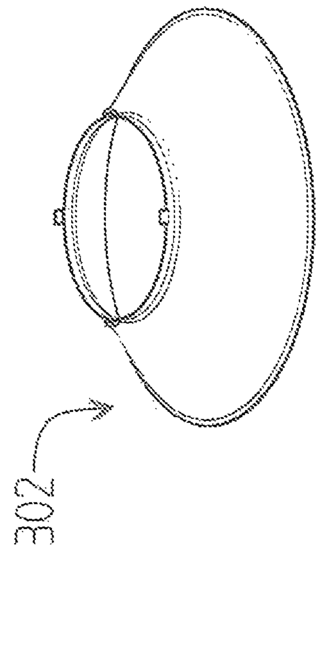
FIG. 7C is a perspective view of an example embodiment of a reflector that is compatible with the concrete structure of FIG. 7A.
Figure 7D:
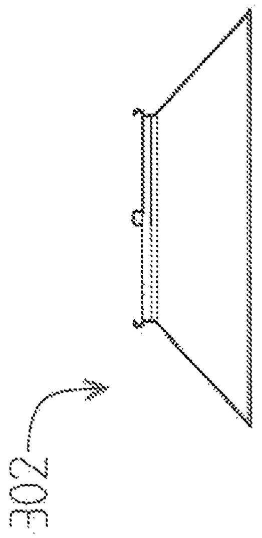
FIG. 7D is an elevation view of the reflector of FIG. 7C.
Figure 8A:
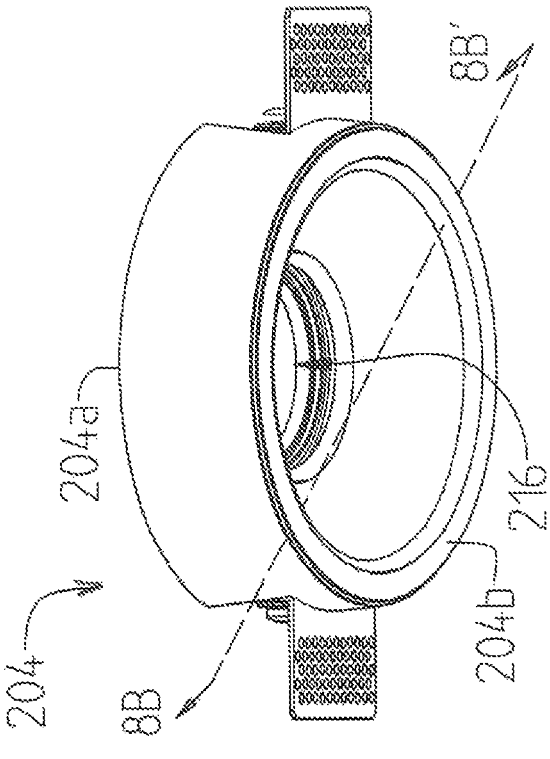
FIG. 8A is a perspective view of a concrete structure, according to still some other example embodiments.
Figure 8B:
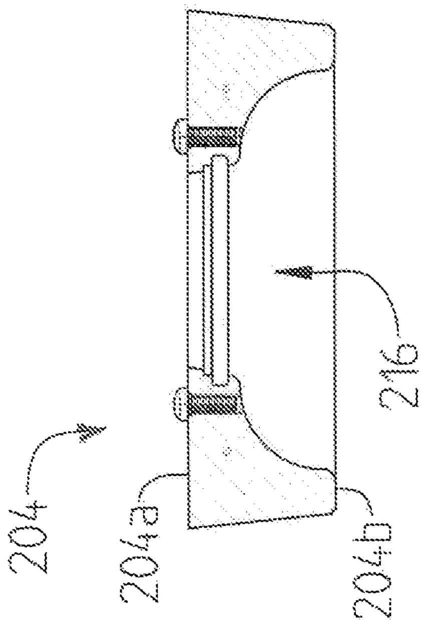
FIG. 8B is a cross-sectional view of the concrete structure of FIG. 8A, taken along the section line 8B-8B' of FIG. 8A.
Figure 8C:
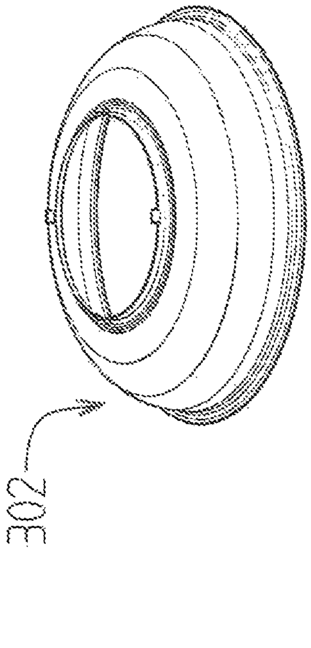
FIG. 8C is a perspective view of an example embodiment of a reflector that is compatible with the concrete structure of FIG. 8A.
Figure 8D:
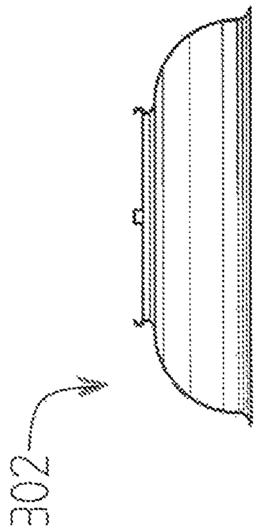
FIG. 8D is an elevation view of the reflector of FIG. 8C.
Figure 9A:
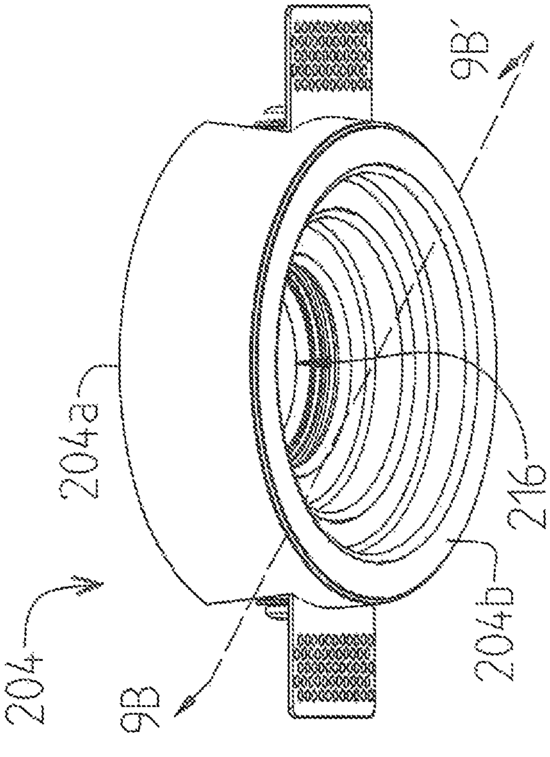
FIG. 9A is a perspective view of a concrete structure, according to still yet some other example embodiments.
Figure 9B:
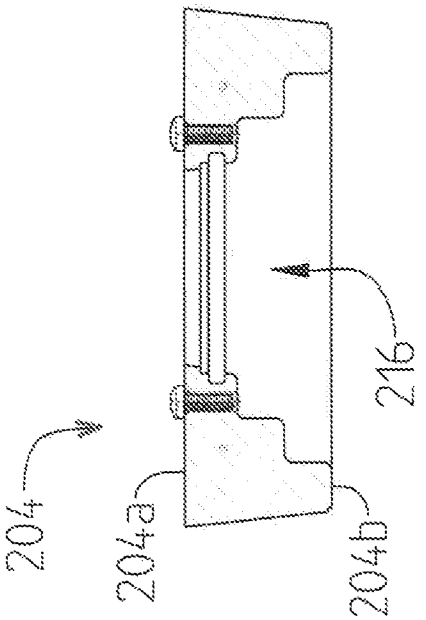
FIG. 9B is a cross-sectional view of the concrete structure of FIG. 9A, taken along the section line 9B-9B' of FIG. 9A.
Figure 9C:
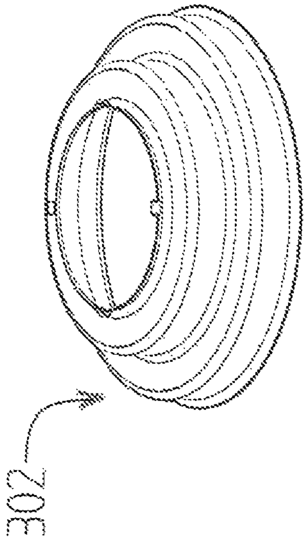
FIG. 9C is a perspective view of an example embodiment of a reflector that is compatible with the concrete structure of FIG. 9A.
Figure 9D:
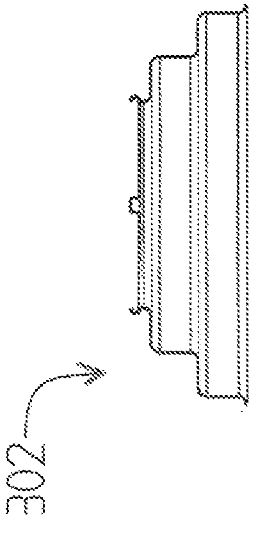
FIG. 9D is an elevation view of the reflector of FIG. 9C.

As shown in FIGS. 2A and 4A-4B, in an upright position, junction box 202 generally includes a top side 202*a*, an opposed bottom side 202*b*, and one or more lateral surfaces 202*c* extending between the top and bottom sides 202*a*, 202*b*. An at least partially hollow interior cavity volume 402 is defined within the box 202 (FIG. 4A) and can house the electrical hardware components 212 and light emitter 214.

In at least one embodiment, the lateral surfaces 202*c* may include one or more punch-out (or knock-out) holes 202*e* (FIGS. 2A and 4B). As explained herein with reference to FIG. 14, punch-out holes 202*e* can be punctured to feed external wiring 502 into the junction box cavity 402 during installation. For example, external wiring 502*a* from a power supply 504 may be fed into the junction box 202 to connect to the light emitter 214. Further, external wiring 502*b* may be fed out of the junction box 202 to connect light emitter 214 to another light emitter 506, e.g., in series electrical wiring.

In some embodiments, the external wiring 502 is fed into, or fed out of, the junction box 202 via conduits or tubes. To this end, the punch-out holes 202*e* may have a generally circular shape with a variable diameter 406 (FIG. 4B) to accommodate different diameters of electrical conduits. For example, some punch-put holes 202*e* may have a diameter dimension of a ½" while others may have a diameters of ¾".

In the illustrated embodiments, the junction box 202 includes eight lateral side surfaces 202*c*. In this manner, box 202 has an octagonal cross-sectional profile defined in a plane orthogonal an extension axis 210*a*, which intersects the top and bottom sides 202*a*, 202*b* of box 202 (FIG. 2A). A punch-out hole 202*e* may be provided on each, or one or more, of the lateral sides 202*c*. An advantage of this design is that electrical conduits can be connected to the junction box 202 from eight different directions. Accordingly, this provides flexibility when installing the junction box 202 inside the concrete structure. In particular, irrespective of the mounting orientation of junction box 202, electrical conduits can be easily connected to a punch-out holes 202*e*, and from multiple directions, and without bending the electrical conduits or re-orienting the junction box 202.

In other cases, the junction box 202 may have any number of lateral side surfaces 202*c*, each having any number of punch-out holes 202*e*. In some cases, rather than having multiple lateral surfaces 202*c*, box 202 may also have a single lateral surface 202*c* defining a circular or ovular cross-sectional profile. Punch-out holes 202*e* may then be located at different positions along the single curved surface profile.

As best shown in FIG. 2A, junction box 202 may have a depth (or height) dimension 202*d*. Depth dimension 202*d* may be defined along the extension axis 210*a*. Any suitable depth dimension 202*d* may be selected. For example, the depth dimension 202*d* may be selected with a view to accommodating different light emitter 214 sizes (e.g., PAR20 bulbs, etc.), as well as various electrical hardware elements 212. Junction box 202 may also have a width dimension 202*f* defined along a lateral axis 210*b*, orthogonal to the extension axis 210*a*.

Referring to FIG. 4A, the top side 202*a* of the junction box 202 may define an opening 404. Opening 404 may provide access into the interior cavity volume 402 of the junction box 202. In some example cases, the top opening 404 may provide a user access into the cavity volume 402 to adjust electrical hardware components 212 during installation and/or mounting of the luminaire 200.

Figure 5A:
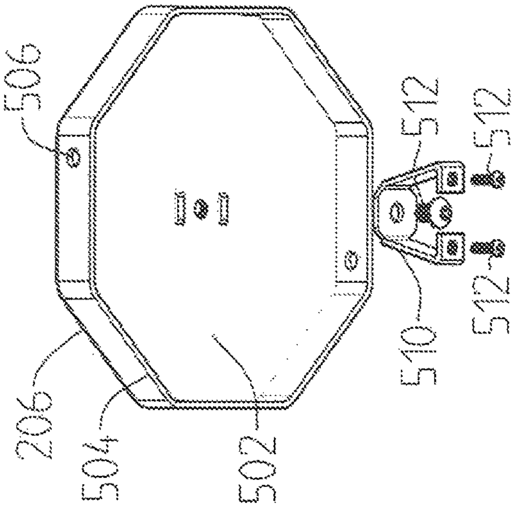
FIG. 5A is a bottom up perspective view of an example openable lid.
Figure 5B:
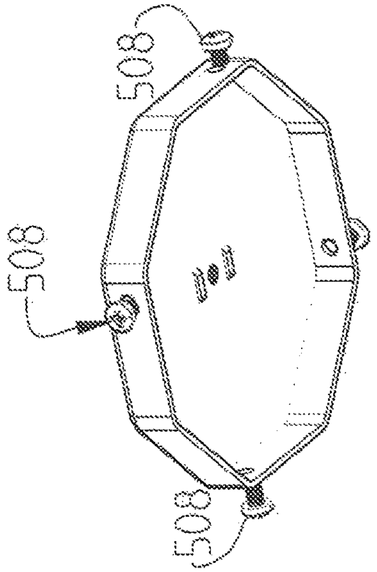
FIG. 5B is another bottom up perspective view of the example openable lid.

In some embodiments, luminaire 200 may further include an openable lid 206 (FIGS. 5A, 5B). Openable lid 206 may be movable between a closed position (FIG. 2A) and an open position (FIG. 3A) relative to the junction box 202. In the open position (FIG. 3A), the openable lid may expose the top opening 404, such as to provide access into the interior volume 402. In the closed position (FIG. 2A), the openable lid 206 may at least partially cover the top opening 404. This, in turn, may prevent contaminants from entering into the internal cavity 402 when the luminaire 200 is an installed position.

In at least one embodiment, which is exemplified in FIGS. 5A-5B, the openable lid 206 may have a surface 502 that is sized and dimensioned to match the cross-sectional profile of the top side 202*a* of junction box 202, e.g., in a plane orthogonal to extension axis 210*a*. For example, the surface 502 may have an octagonal shape that matches the octagonal cross-sectional profile of junction box 202. In this manner, a tight-fit engagement is provided in the closed position between lid 206 and the top box side 202*a*.

In some cases, a lip 504 may at least partially surround the side edge of the surface 502. When the lid 206 is in the closed position, the lip 504 overlaps (e.g., hugs) the junction box 202. That is, the lip 504 overlaps the junction box's lateral surface 202*c*. In this configuration, lip 504 positionally retains the openable lid 206 in the closed position and otherwise prevents dislocation of the openable lid 206.

In some embodiments, a securing mechanism may secure the openable lid 206 to the junction box 202 in the closed position. For example, as best shown in FIGS. 5A and 5B, the one or more surfaces of the edge lip 504 may include through openings 506. In the closed position, through openings 506 positionally align with corresponding openings 410 on the junction box's lateral surfaces 202*c* (FIG. 4B). In the closed position, fasteners 508 (e.g., bolts) are inserted through the openings 506 and 410 and tightened so as secure the lid 206 to the junction box 202. In other embodiments, any other securing mechanism known in the art can be used for securing the lid 206 to the box 202 in the closed position.

While the illustrated embodiments have exemplified the openable lid 206 as being removable from the junction box 202 in the open position, in other cases, openable lid 206 may be movable between the closed and open positions in any other manner known in the art. For example, lid 206 may rotatably connect to the junction box 202 via a rotating hinge mechanism. In some cases, the openable lid 206 may not be provided, and the top junction box side 202*a* may simply have no opening 404.

A support member 510 may also be coupled to the openable lid 206 (FIG. 5A). For example, the support member 510 may be fastened to the lid 206 via fasteners 512. Support member 510 can be used to support various electrical hardware 212 (e.g., a socket or lamp holder) inside the junction box 202 (FIG. 2B).

As shown in FIG. 4A, similar to the top side 202*a*, the bottom side 202*b* of junction box side 202 may also at least partially open into the interior box volume 404. As shown in FIG. 2B, this design allows light to pass between the interior box volume 404 and the concrete structure 204, e.g., from a light emitter 214.

Concrete Structure

As stated previously, while the base structure 204 may be manufactured from various natural or engineered stones, for ease of description, the remaining discussion focuses on a concrete base structure 204.

Figure 2D:
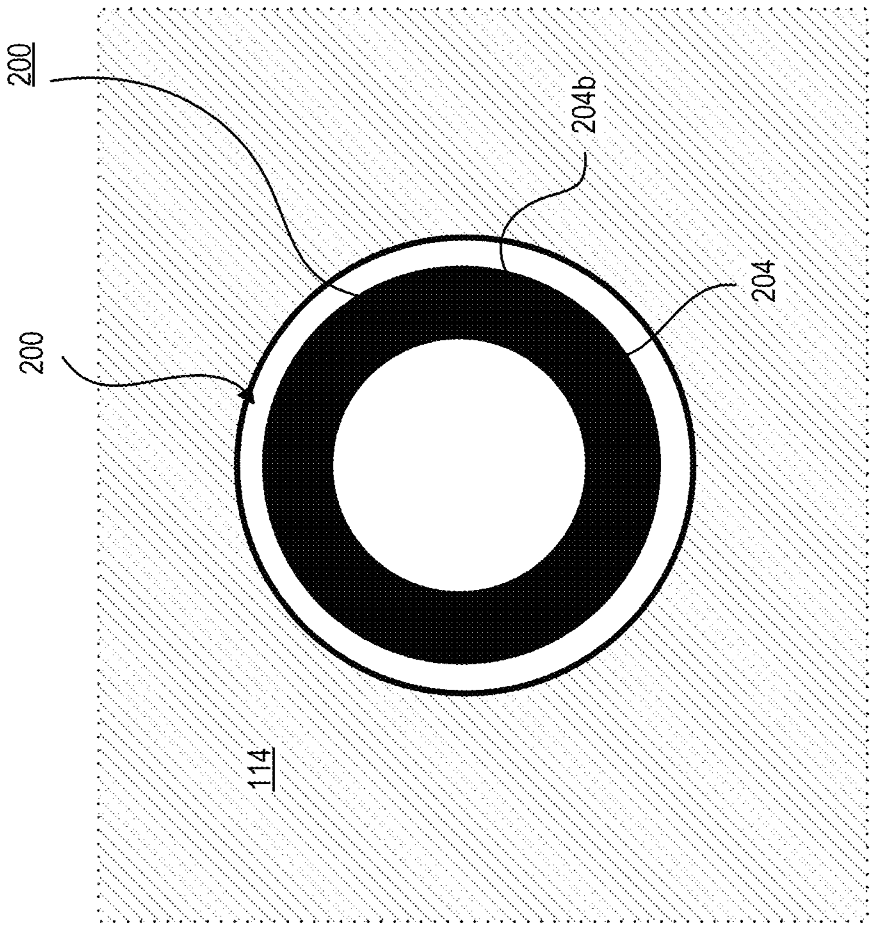
FIG. 2D is a face-on view of a recessed concrete luminaire in an installed position within a concrete mounting structure.

The concrete structure 204 provides a light passage 216 through which light, emitted by a light emitter 214, may pass to illuminate a surrounding environment. As stated previously, in the installed position (FIG. 2A), the concrete structure 204 may not protrude from the concrete mounting structure 102, but may appear substantially flush with the exposed concrete surface 114 (FIG. 2D).

It can be appreciated that the use of concrete material for the concrete structure 204 is to allow the luminaire, in a recessed position, to blend in with the surrounding concrete mounting structure 112.

In at least one embodiment, the structural concrete may be designed to have a modifiable or variable compressive strength (f'c). In general, the concrete compressive strength of a typical concrete building is in a range of between 30 to 40 MPa (300 to 400 Kg/cm$^2$). Accordingly, in embodiments herein, the concrete structure 204 may be manufactured with a variable compressive strength to substantially match the compressive strength of concrete in the concrete mounting structure (e.g., an equal match, or within a pre-defined range such as ±5 MPa).

In some examples, for compressive strengths up to 40 MPa, the concrete structure 204 may be strengthened by increasing the cement in the concrete mixture. In contrast, for compressive strengths above 40 MPa, the addition of cement to the concrete mixture may have the adverse effect of reducing the total compressive strength. Accordingly, in these cases, the concrete structure 204 is reinforced with steel wire to allow the luminaire to maintain its structural integrity in view of the surrounding concrete.

In other cases, concrete structure 204 may also be reinforced by adding additives, such as superplasticizers and/or polypropylene fiber or any other suitable reinforcement material. In particular, polypropylene fibers improve the strength of the concrete by incorporating the chopped filaments into concrete by mixing. Further, the use of superplastisizers reduces the water content required for the batching of the concrete mixture and maintaining the viscosity of concrete. Reducing water percentage added to concrete leads to a lower water to cement ratio (W/C ratio), and increases the compressive strength of the concrete mixture.

In some embodiments, the concrete structure 204 may also be manufactured with varying selectable colors to allow the concrete structure 204 to better blend with the surrounding mounting structure 102. The concrete color may be manufactured by adding color pigment to the concrete mixture during manufacturing of the concrete structure 204.

As best shown in FIG. 2A, concrete structure 204 may include a top surface 204*a* (also referred to herein as an inner surface), an opposed bottom surface 204*b* (also referred to herein as an outside surface or exposed surface) and a lateral side surface 204*c* extending between the top and bottom surfaces 204*a*, 204*b*. In the assembled state, the top surface 204*a* may be connected to the junction box 202, e.g., the bottom surface 202*b* of the junction box 202. Further, in the installed position, the bottom surface 204*b* may be the only portion of the luminaire 200 exposed outside of the concrete mounting structure 102 (FIG. 2C). In some embodiments, the bottom surface 204*b* may have a smooth and natural concrete look to blend with the external concrete mounting surface 114.

Concrete structure 204 may also have a depth dimension 204*d*. Depth dimension 204*d* is defined between the top surface 204*a* and bottom surface 204*b*, and along the extension axis 210*a*. A width dimension 204*e* may be further defined along lateral axis 210*b*, between opposing ends of the lateral side surface 204*c*. In at least one embodiment, the width dimension 204*e*, along the top side 204*a* of the concrete structure 204, may at least match a width dimension 202*f* of the bottom side 202*b* of the junction box 202.

As shown in FIG. 2B, the lateral surface 204*c* may have an outer profile. The outer profile may be defined along a cross-sectional plane that is orthogonal to the lateral axis 210*b*. The outer profile may have a generally frustoconical or frustum shape whereby the width 204*e* of the concrete structure 204 is larger at the top side 204*a* as contrasted to the bottom side 204*b* (e.g., the lateral surface 204*c* tapers inwardly from the top side 204*a* to the bottom side 204*b*). The frustum shape may be so configured to resist against vertical punching shear inside the concrete mounting structure 102. In other embodiments, the lateral surface 204*c* may have any other suitable outer profile including, for example, a square or rectangular profile.

Figure 2E:
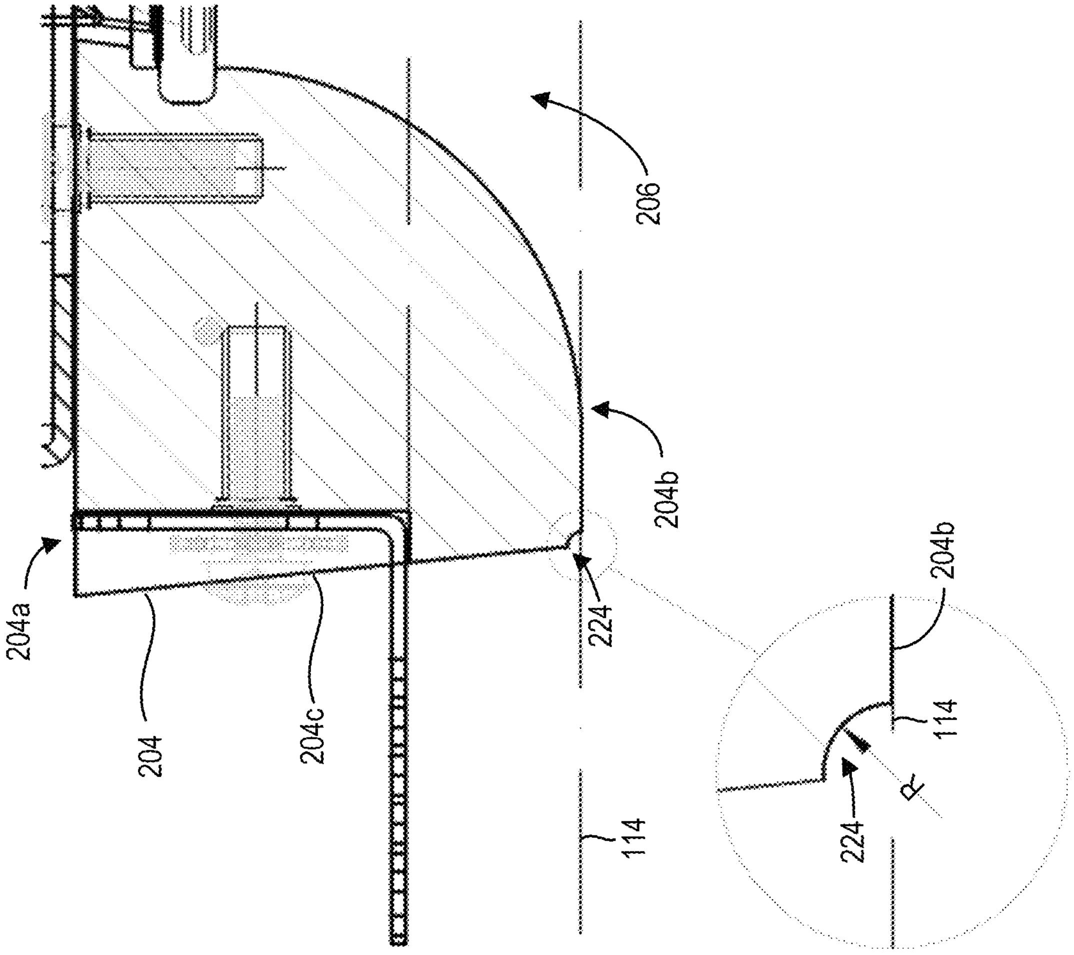
FIG. 2E is a cross-sectional view of a portion of the luminaire of FIG. 2A, taken along the section line 2B-2B' of FIG. 2A.

In some examples, the bottom side 204*b* of the concrete structure 204 may include a cove groove 224 (FIG. 2E). Groove 224 may be depressed radially inwardly into the lateral side surface 204*c*, and may extend along the length (e.g., circumference) of the bottom side 204*b*. In at least one embodiment, the groove 224 may have a curvature radius ("R") of approximately 1 mm.

Figure 2F:
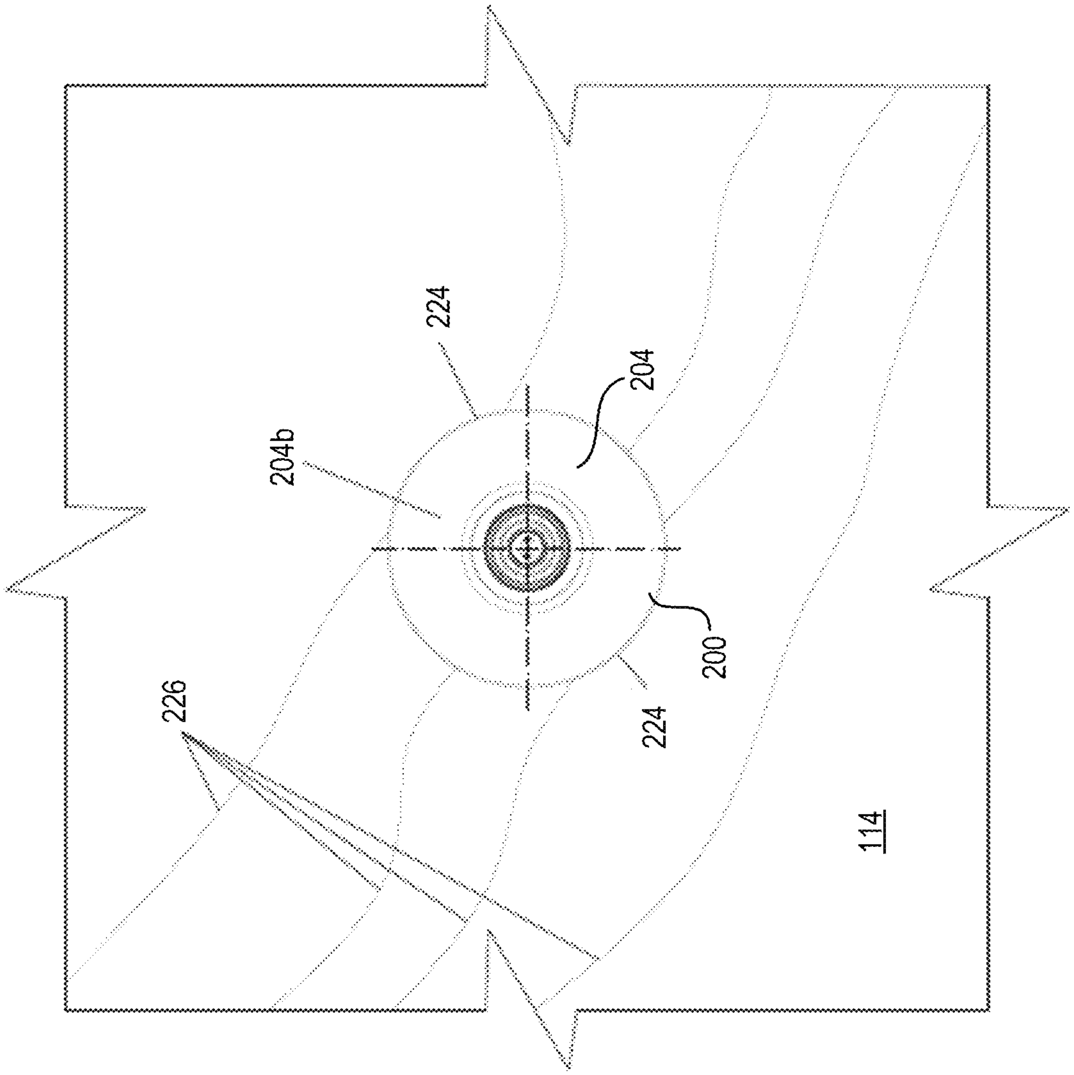
FIG. 2F is another face-on view of a recessed concrete luminaire in the installed position within a concrete mounting structure.

It has been appreciated that the groove 224 may function as a cold joint when the luminaire 200 is in the installed position. As the concrete structure 204 is embedded within the concrete mounting structure 114 in the installed position, there is a risk that cracks forming in the concrete structure 114 (e.g., hairline ceiling cracks 226 in FIG. 2F) may extend to, and damage the luminaire's concrete structure 204. To prevent extension of such cracks 224, the groove 224 which runs along the bottom side 204*b* of the concrete structure, and interfaces with the concrete mounting structure, may be filled with material having less strength and cohesion than the compressive strength of the concrete mounting structure. For example, the groove 224 may be filled with cement and various fine aggregates. This, in turn, forms a cold joint as the ceiling hairline cracks are often unable to pass through the material barrier that fills the groove 224 (FIG. 2F).

As shown in FIGS. 2B and 3, the concrete structure 204 may include a light opening passage 216 extending between, and through, the top side 204*a* and bottom side 204*b*. In at least one example, the light opening passage 216 may have a bottom lateral width 220*b* that is narrower than a top lateral width 220*a*, such that light opening passage 216 expands in lateral cross-section between the top side and bottom sides. This, in turn, allows emitted light to expand to fill the surrounding environment.

Figure 10A:
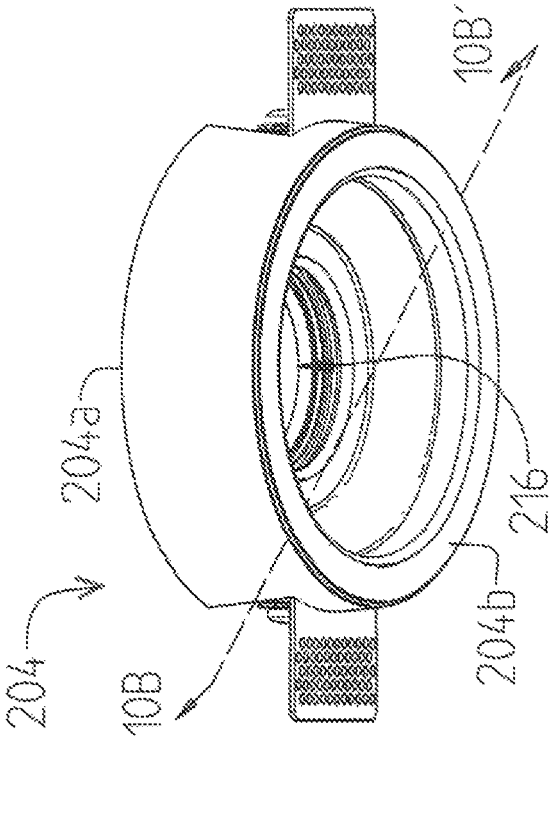
FIG. 10A is a perspective view of a concrete structure, according to some example embodiments.
Figure 10B:
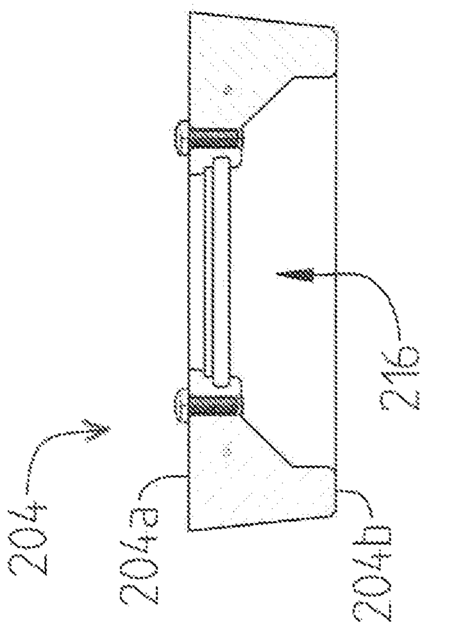
FIG. 10B is a cross-sectional view of the concrete structure of FIG. 10A, taken along the section line 10B-10B' of FIG. 10A.

Light opening passage 216 may have any suitable cross-sectional profile defined along a plane parallel to the extension axis 210*a*. FIGS. 6-13 illustrate various example profiles for the light passage 216. As shown, the light passage 216 may have a generally curved convex profile (FIGS. 6A, 6B), a linear tapered profile (FIGS. 7A, 7B), a curved concave profile (FIGS. 8A, 8B), a stepped profile (FIGS. 9A, 9B) or a partially tapered profile (FIGS. 10A, 10B).

Figure 3A:
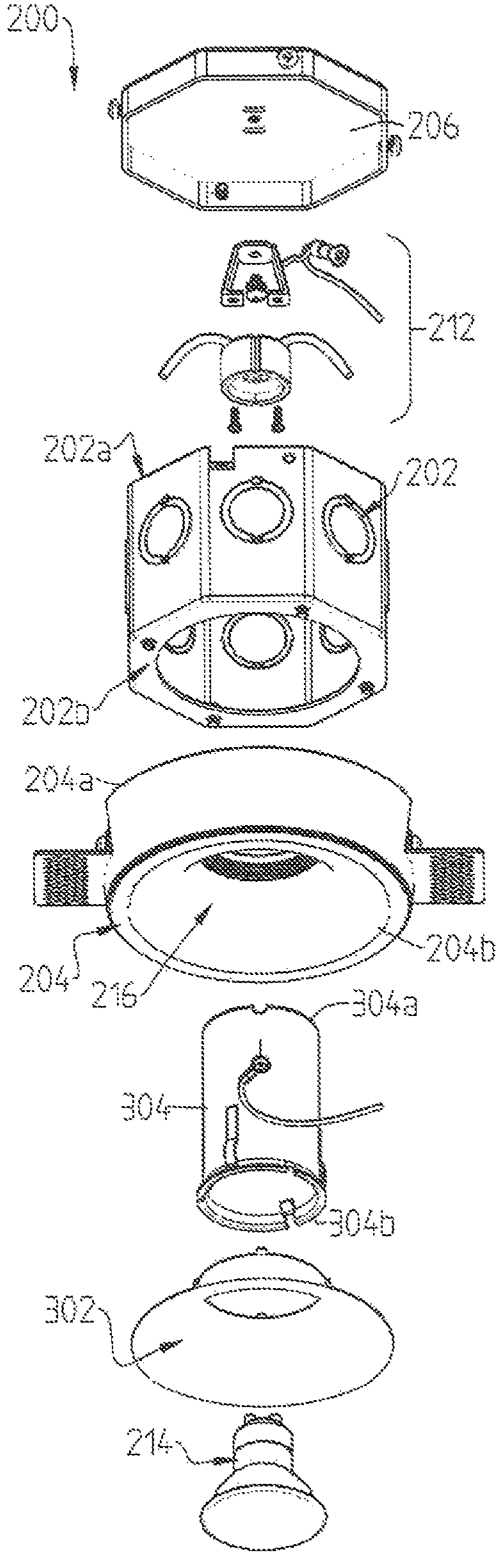
FIG. 3A is an exploded view of an example embodiment of a recessed concrete luminaire.
Figure 10C:
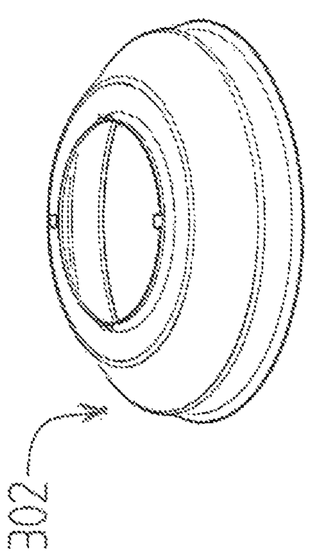
FIG. 10C is a perspective view of an example embodiment of a reflector that is compatible with the concrete structure of FIG. 10A.
Figure 10D:
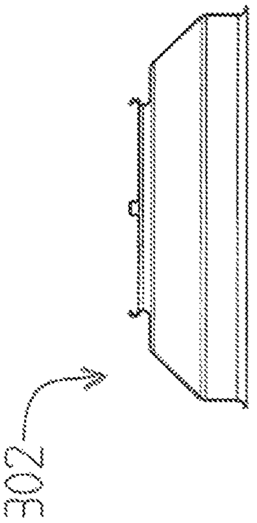
FIG. 10D is an elevation view of the reflector of FIG. 10C.

In at least one embodiment, the luminaire 200 may include a decorative reflector 302 (FIG. 3A). In an assembled state, the reflector 302 may be nested into the light passage 216 and can provide added reflectivity for emitted light. The reflector 302 may have a shape and profile design that complements, or matches, the cross-sectional profile of the light passage 216. For example, the reflector 302 may have a generally curved convex profile (FIGS. 6C, 6D), a linear tapered profile (FIGS. 7C, 7D), a curved concave profile (FIGS. 8C, 8D), a stepped profile (FIGS. 9C, 9D) or a partially tapered profile (FIGS. 10C, 10D). The reflectors may be made of various different materials, including metal. Further, the reflector 302 may have different colors, e.g., black, white, silver, bronze, gold, to color the emitted light.

Example Coupling Between Junction Box and Concrete Structure

In an assembled state, the junction box 202 may be disposed over the concrete structure 204. In other words, the bottom side 202*b* of juncture box 202 may abut (or engage) the top side 204*a* of the concrete structure 204. In this configuration, the opening on the bottom side 202*b* may substantially align, e.g., along extension axis 210*a*, with the light opening passage 216 in the concrete structure (FIG. 2B).

The junction box 202 may be connected to the concrete structure 204 in any manner known in the art. For instance, in the exemplified embodiments, the bottom junction box side 202*b* may include one or more inwardly extending tabs 412 having through openings 414 (FIG. 4A). As shown in FIG. 2B, when the box 202 is placed over the concrete structure 204, one or more fasteners 218 (e.g., bolts) are inserted through the tab openings 414, and into recesses 222 that extend into the concrete structure 204.

Examples for Multiple Light Emitters

Figure 11A:
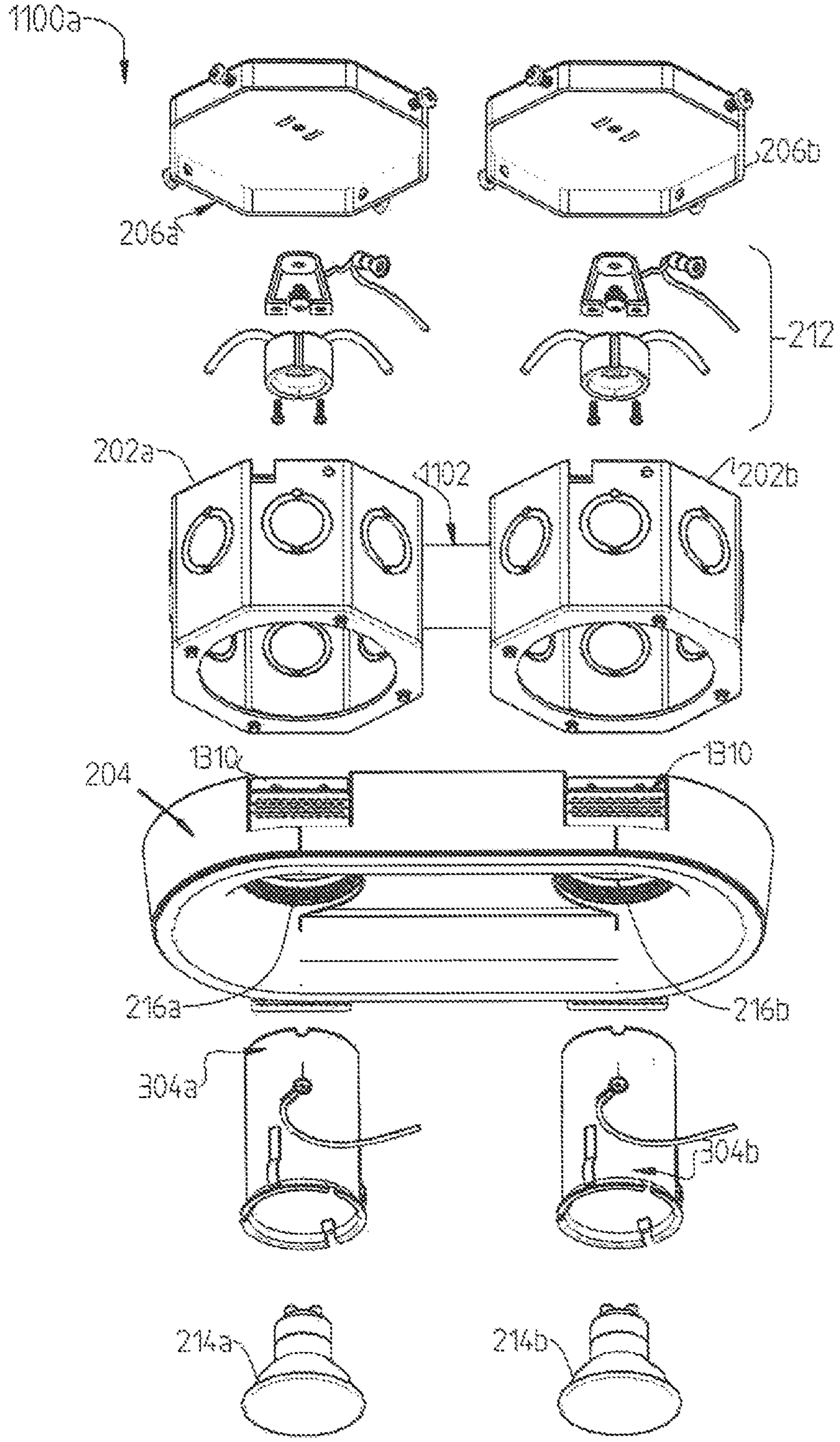
FIG. 11A is an exploded view of an example embodiment of a recessed concrete luminaire, in accordance with some other embodiments.
Figure 11B:
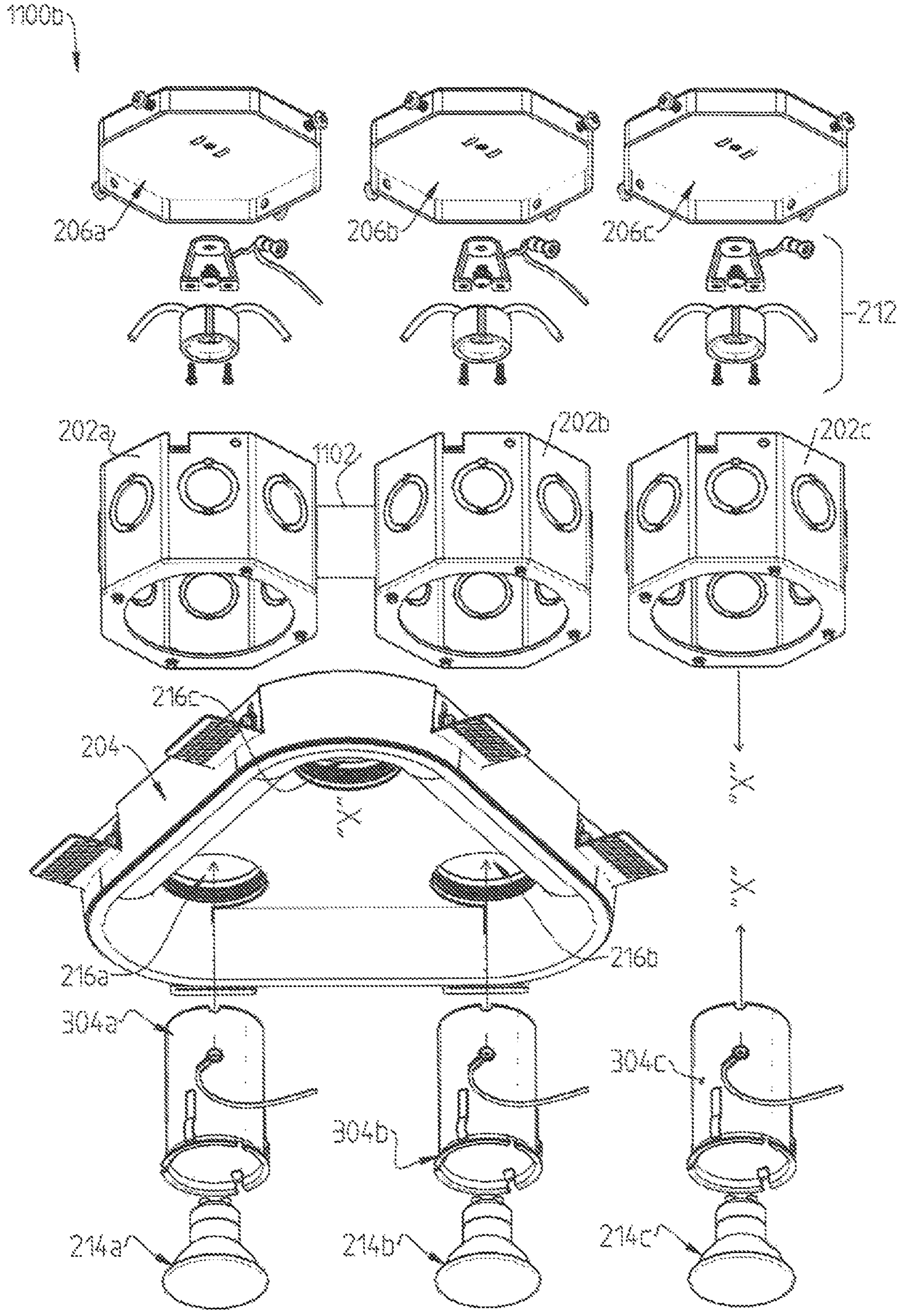
FIG. 11B is an exploded view of an example embodiment of a recessed concrete luminaire, in accordance with still some other embodiments.
Figure 11C:
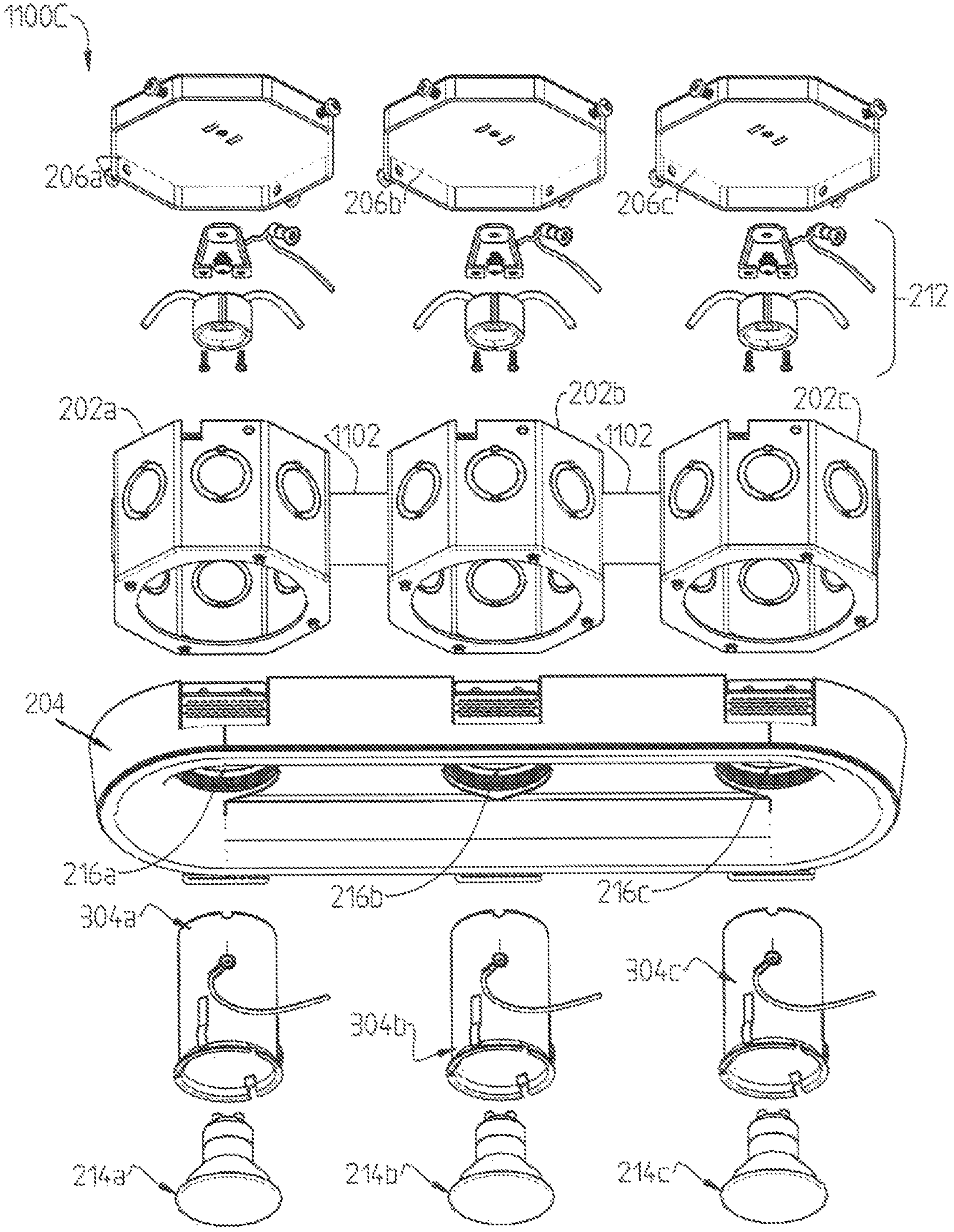
FIG. 11C is an exploded view of an example embodiment of a recessed concrete luminaire, in accordance with still yet some other embodiments.
Figure 12:
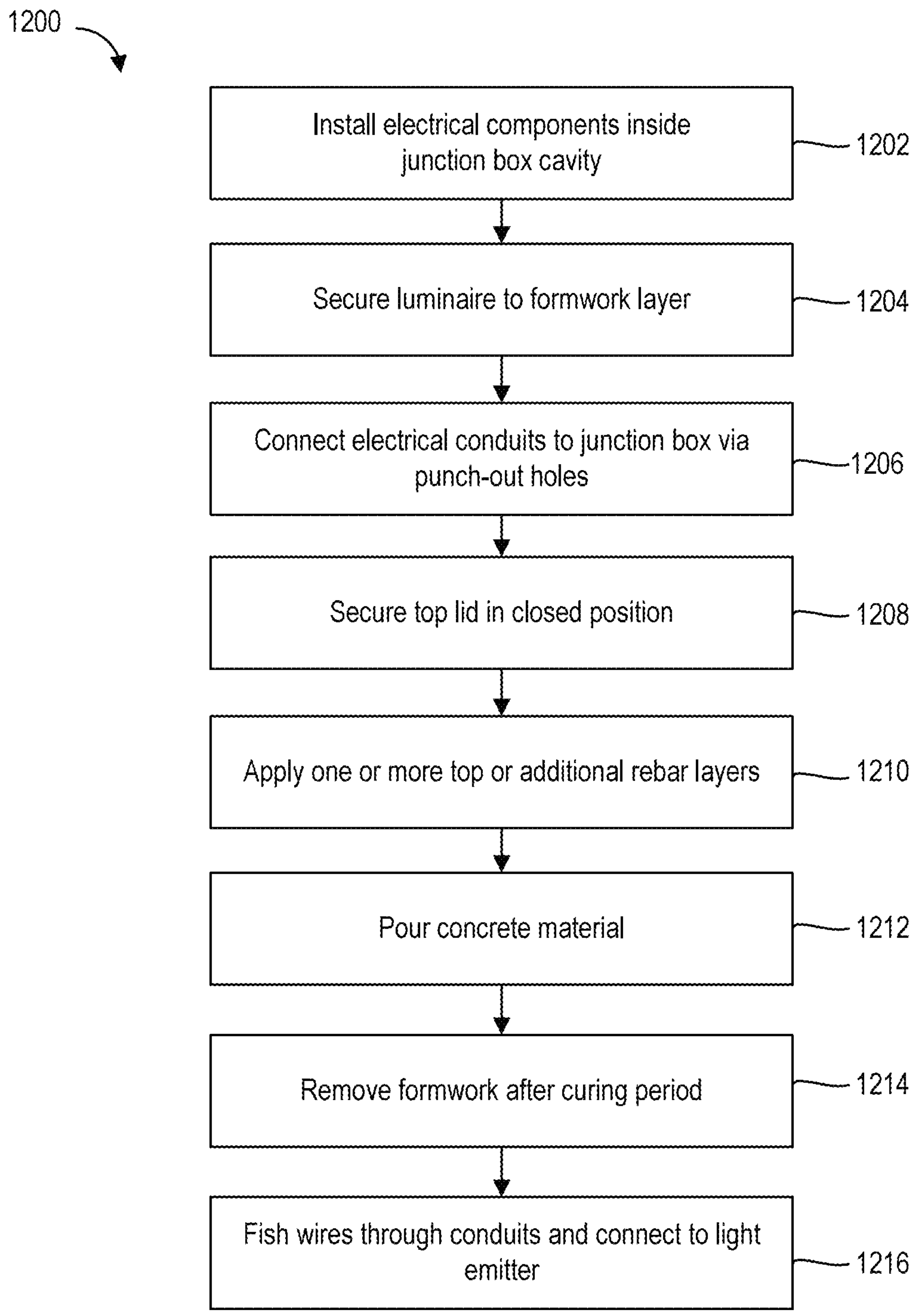
FIG. 12 is a process flow for an example embodiment for installing a recessed concrete luminaire, e.g., in concrete ceilings and or horizontal concrete members.
Figure 13:
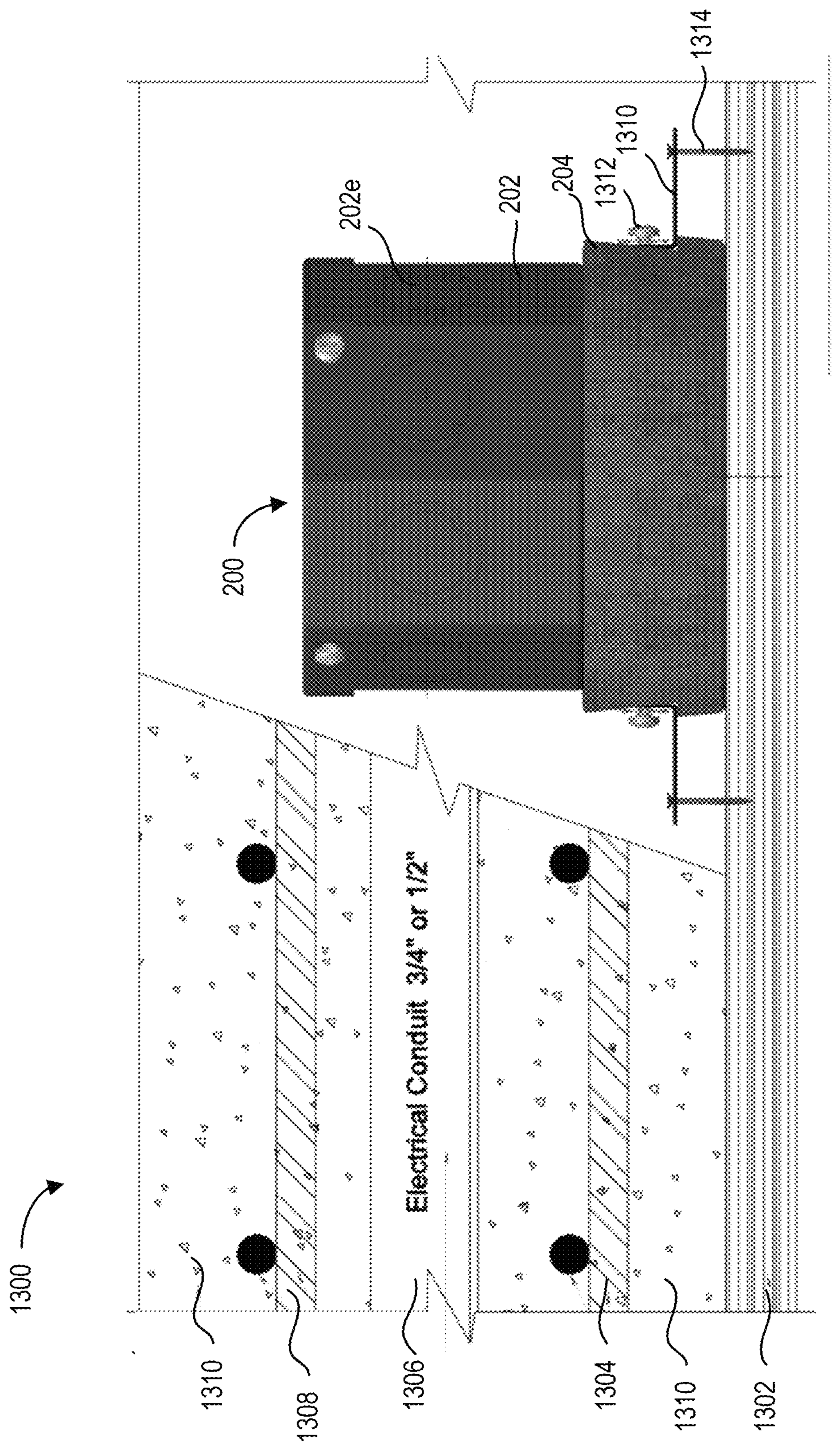
FIG. 13 is a partial cutaway view of a recessed concrete luminaire in an installed position with respect to a concrete mounting structure.

Reference is now made to FIGS. 11-13, which illustrate embodiments that can accommodate multiple light emitters.

As shown, multiple junction boxes 202 may be combined with concrete structures 204 having a plurality of light passage openings 216 to accommodate a plurality of light emitters 214. FIG. 11A shows an example embodiment of a luminaire 1100*a* that includes a concrete structure 204 comprising two side-by-side light passage openings 216*a*, 216*b* and corresponding junction boxes 202*a*, 202*b* to accommodate two light emitters 214*a*, 214*b* (also referred to herein as a dual light emitter luminaire). In some embodiments, the junction boxes 202 may be coupled by a connector 1102, which accommodates linking electrical wiring between light emitters 214.

FIGS. 11B and 11C show further example embodiments of luminaires 1100*b*, 1100*c* that include a concrete structure 204 comprising three light passage openings 216*a*-216*c* and corresponding junction boxes 202*a*-202*c* to accommodate three light emitters 214*a*, 214*b* (also referred to herein as a triple light emitter luminaire). To this end, the light passage openings 216 may be arranged in a triangular configuration (FIG. 11B), or a linear configuration (FIG. 11C).

In view of the foregoing, it will be understood that the concrete structure 204 may be molded to include any number, and any configuration, of light passage openings 216 to accommodate any number of light emitters 214 inside corresponding junction boxes 202.

Example Method for Installing Concrete Recessed Luminaire

Reference is now made to FIG. 12, which shows an example process flow for a method 1200 for installing a recessed concrete luminaire which is an in assembled state (e.g., the junction box 202 is connected to the concrete structure 204). Concurrent reference is also made to FIGS. 13-16, which provides a visual illustration 1300 of the installation process. Method 1200 may apply to installing the recessed concrete luminaire in various concrete structures, e.g., concrete ceilings and or horizontal concrete members.

At 1202, the electrical hardware components 212 are installed inside the interior volume 402 of the junction box 202. For example, this may be performed by opening the top openable lid 206 to access the interior box volume 402.

At 1204, the luminaire 200 is secured to a concrete formwork layer 1302 of a concrete framework structure. For example, one or more retention mechanisms 1310 (e.g., L-shaped steel brackets) may be attached at one end to the concrete structure 204 via fasteners 1312 (e.g., to the lateral side surface 204*c*), and may be secured to the formwork layer 1302 via fasteners 1314 (FIG. 13). The luminaire 200 may be secured to one of a horizontal formwork layer (e.g., ceilings) and a vertical formwork layer (e.g., support columns). In some cases, prior to installing the luminaire 200, the bottom reinforcement bar layers 1304 (rebar layers), as well as the electrical conduit 1304 may be pre-installed.

Figure 16A:
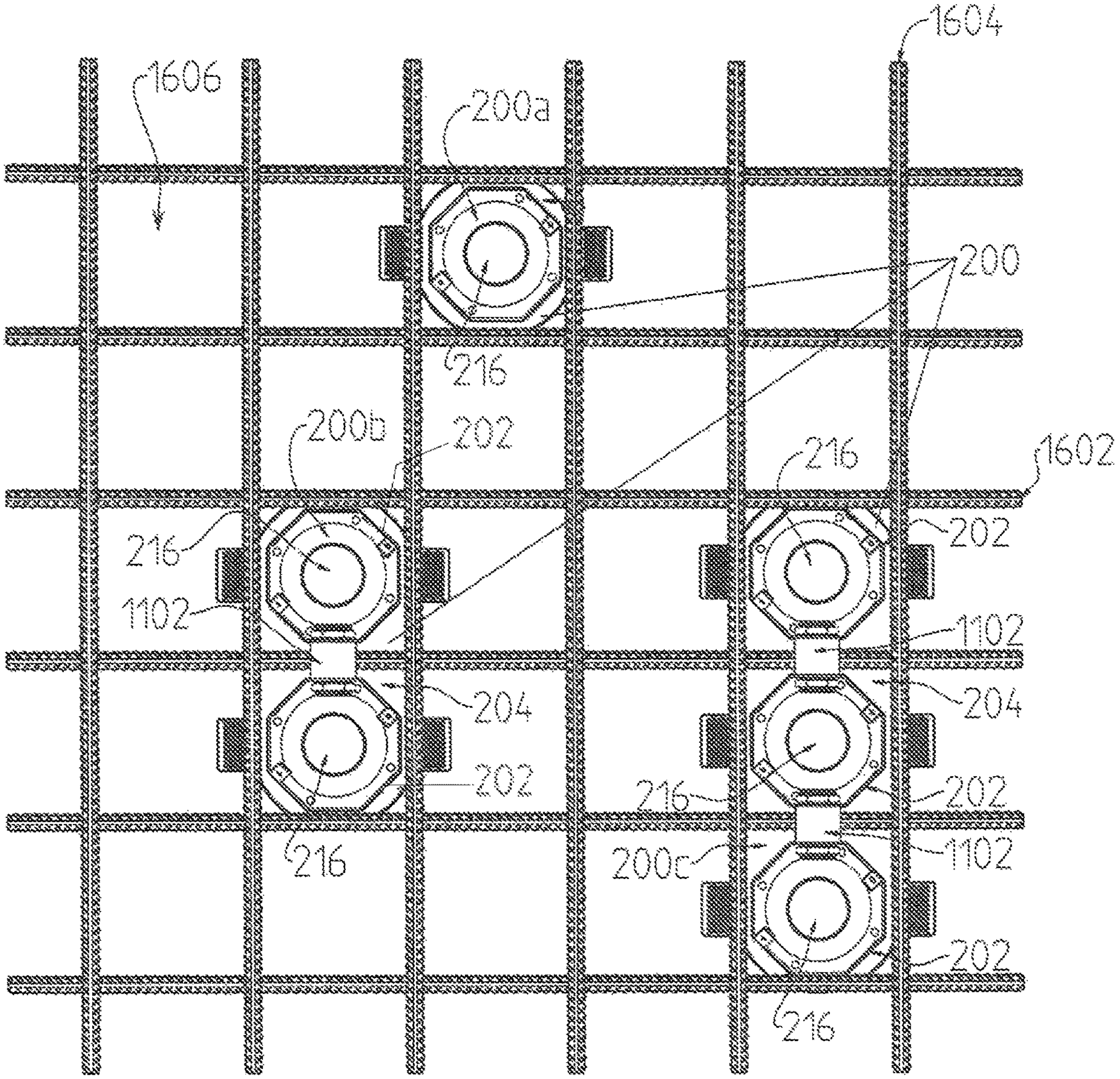
FIG. 16A is an illustration of an example configuration for reinforcement bars, according to some embodiments.
Figure 16B:
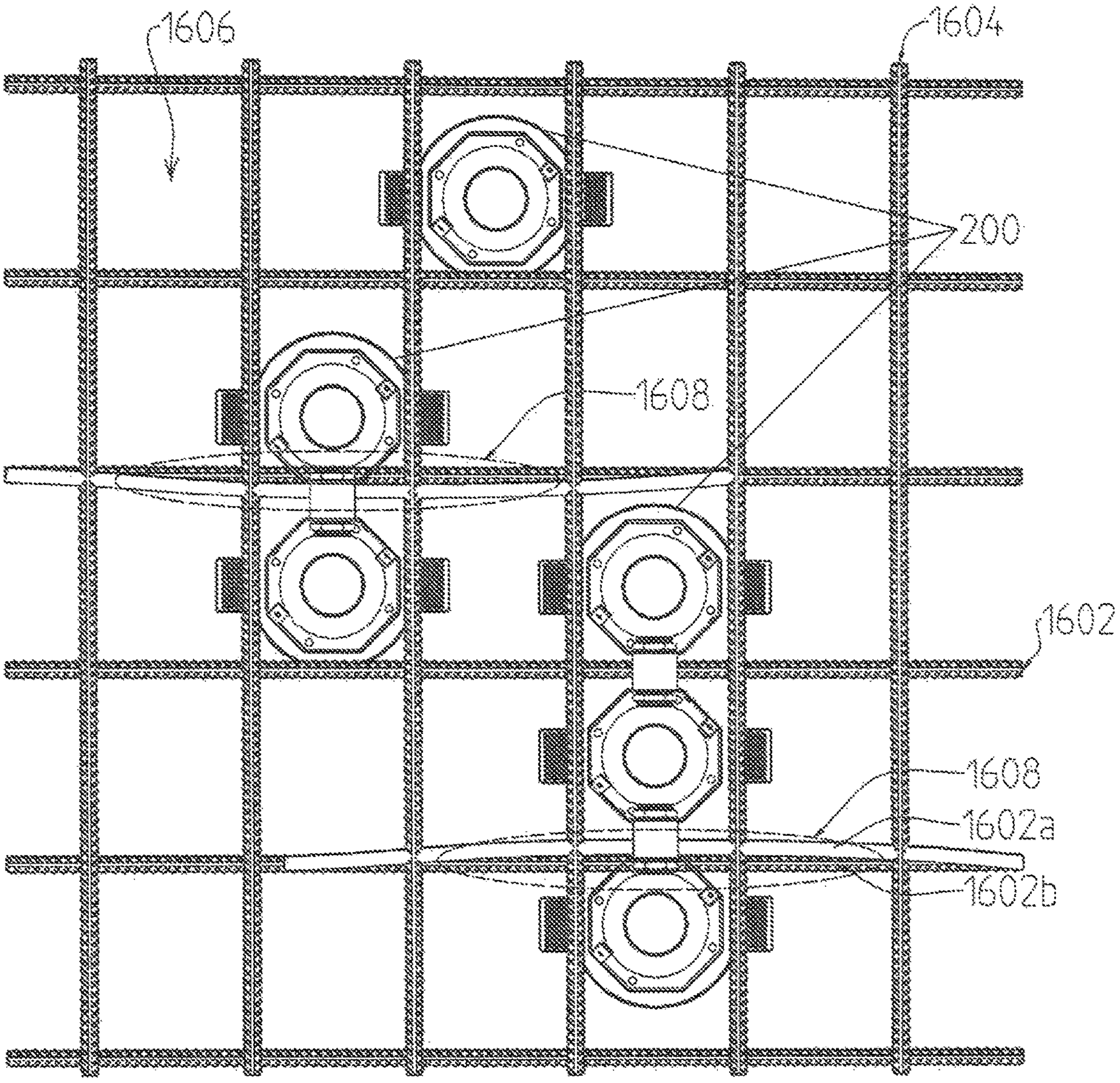
FIG. 16B is an illustration of an example configuration for reinforcement bars, according to some other embodiments.
Figure 16C:
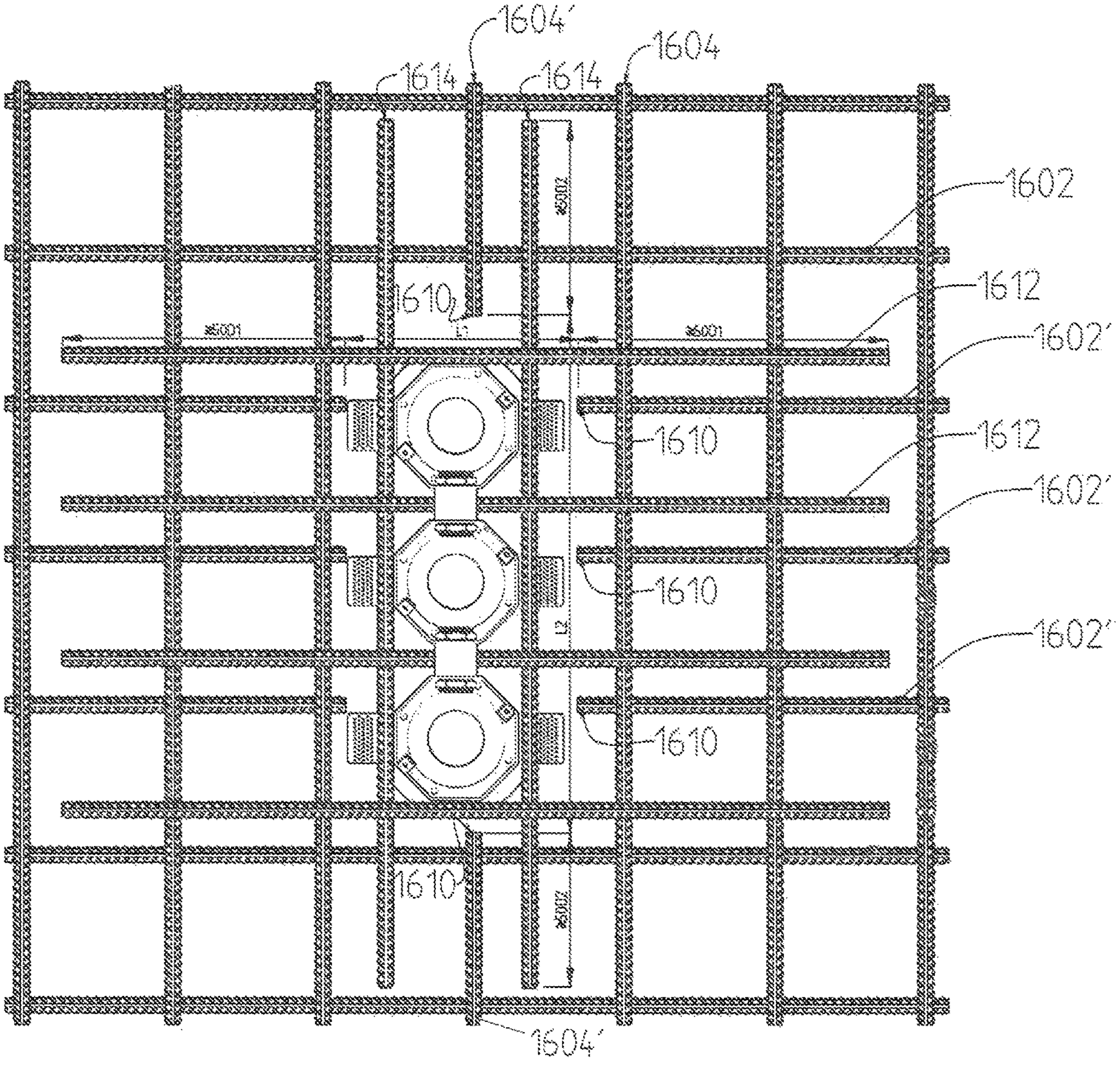
FIG. 16C is an illustration of an example configuration for reinforcement bars, according to still some other embodiments.

Referring briefly to FIGS. 16A-16C, various installation configurations are possible with respect to installing the reinforcement bars around the luminaires 200. For example, as shown in each of these figures, a grid network of horizontal reinforcement bars 1602 and vertical reinforcement bars 1604 are laid out over the concrete structures 204 of each luminaire 200.

As best shown in FIG. 16A, in at least one embodiment, the reinforcement bars 1602, 1604 are positioned to avoid interfering with the luminaires 200. For example, the rebars 1602, 1604 are installed such that the void spaces 1606 (e.g., bounded by the rebars 1602, 1604), are positioned around the light passage 216 of each concrete structure 204. For instance, a void space 1606 may be positioned around the single light emitter luminaire 200*a*. In other cases, the rebars 1602, 1604 may be positioned around a dual light emitter luminaire 200*b* or a triple light emitter luminaire 200*c*. In this configuration, the rebars may pass in the space between the concrete structure 204 and the connectors 1102 (FIGS. 11B and 11C).

As best shown in FIG. 16B, in some cases, the rebars 1602, 1604 may inadvertently interfere with the luminaires (e.g., regions 1608). In these cases, it may be possible to bend some of the rebars 1602*b*. In various cases, the rebar displacement should comply with certain codes and standards that specify allowable tolerances for bending the rebars (e.g., the tolerance for bending the rebars can be one-quarter specified distance between rebars not to exceed ±25 mm, according to some code regulations).

As best shown in FIG. 16C, in yet some other cases, it may not be possible to place the rebars 1602, 1604 without interference from luminaire 200. Further, it may also not be possible to bend the rebars 1602, 1604 if the rebar displacement is greater than the allowable tolerances. Accordingly, as a mitigatory solution, the interfering rebars (1602' and 1604') may be cut at the position of the luminaire 200 (e.g., cut points 1610). Further, additional rebars 1612, 1614 and can be placed through or in vicinity of the luminaire 200 to compensate for the cut rebars.

Figure 16D:
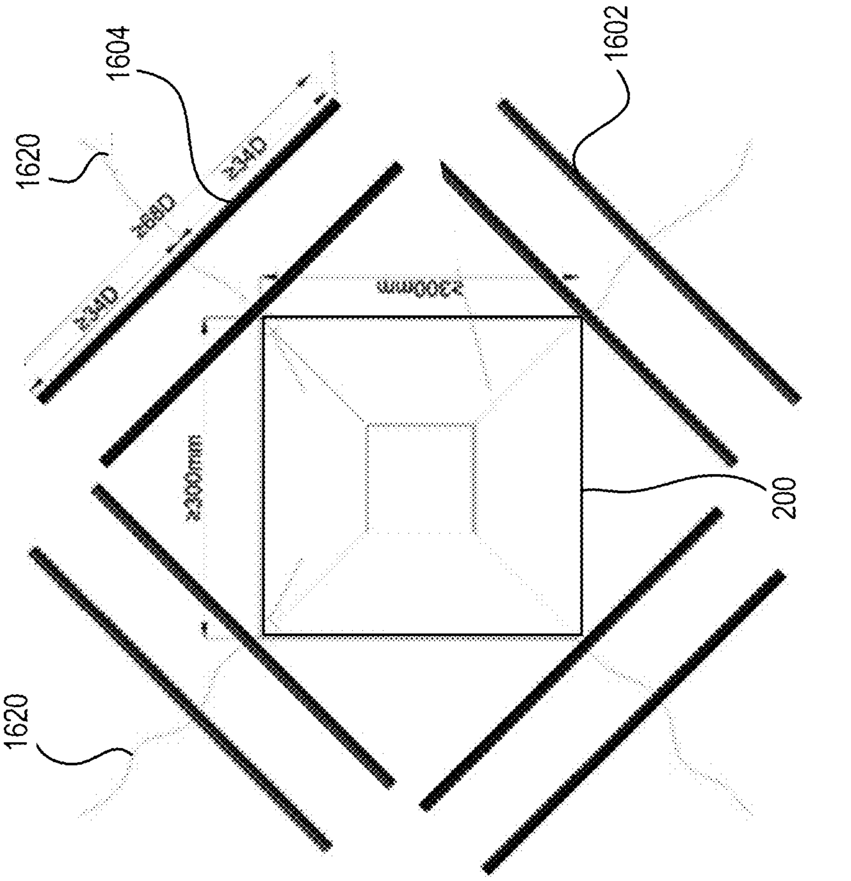
FIG. 16D is an illustration of an example configuration for reinforcement bars, according to still yet some other embodiments.

As shown in FIG. 16D, in some cases, it may be preferable to use diagonally oriented rebars 1602, 1604 in each layer of reinforcement of concrete member for installing sharp-angled angular luminaires 200. For example, this may be advantageous to prevent the possibility of diagonal cracks 1620 in the corners.

In some examples, prior (or after) securing the luminaire 200 to the concrete formwork layer 1302, the luminaire 200 may be waterproofed. For example, the exposed surface (e.g., the exposed bottom surface 204*b*) of the concrete luminaires can be sprayed with a concrete water proofer and or sealer solution. A water-based silicone waterproofing solution may penetrate the surface of the concrete structure 204, and may reduce the water absorption of the concrete surface. In particular, the water proofer/or sealer solution avoids any wet concrete splash or and water cement leak from sticking to the exposed bottom surface 204*b* when wet concrete is vibrated. In some cases, the applied solution can also prevent discoloration of the concrete structure 204 over time.

Figure 15A:
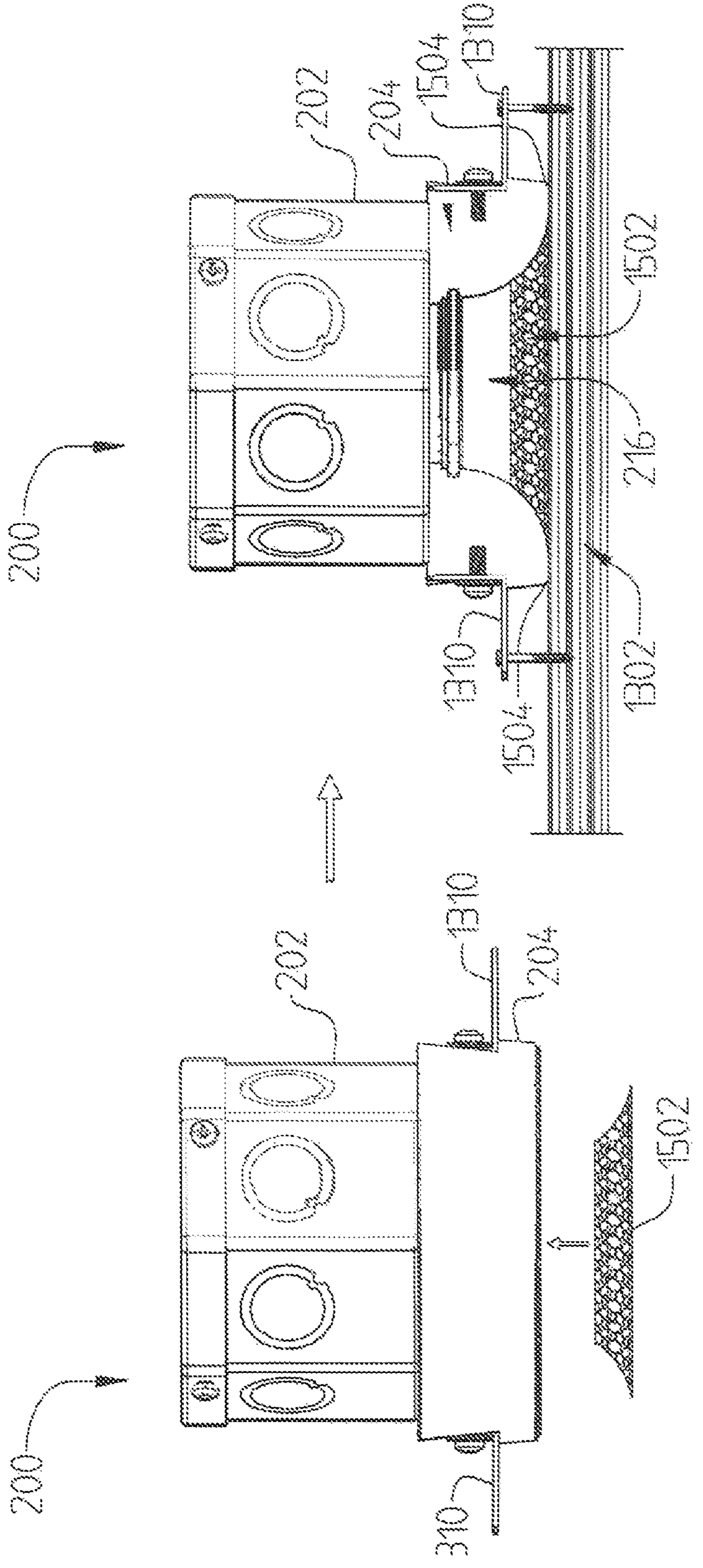
FIG. 15A illustrates an example protective material being inserted into a concrete luminaire during the installation process.

In some embodiments, as shown in FIGS. 15A, a protective cap 1502 (e.g., a protective Styrofoam® cap) may also be at least partially inserted into the passage opening 216 of the concrete structure 204. The protective cap 1502 can occupy the majority volume inside the passage 216 such as to prevent water-cement leaking when pouring and vibrating wet concrete during the installation process (e.g., leakage points 1504).

Figure 15B:
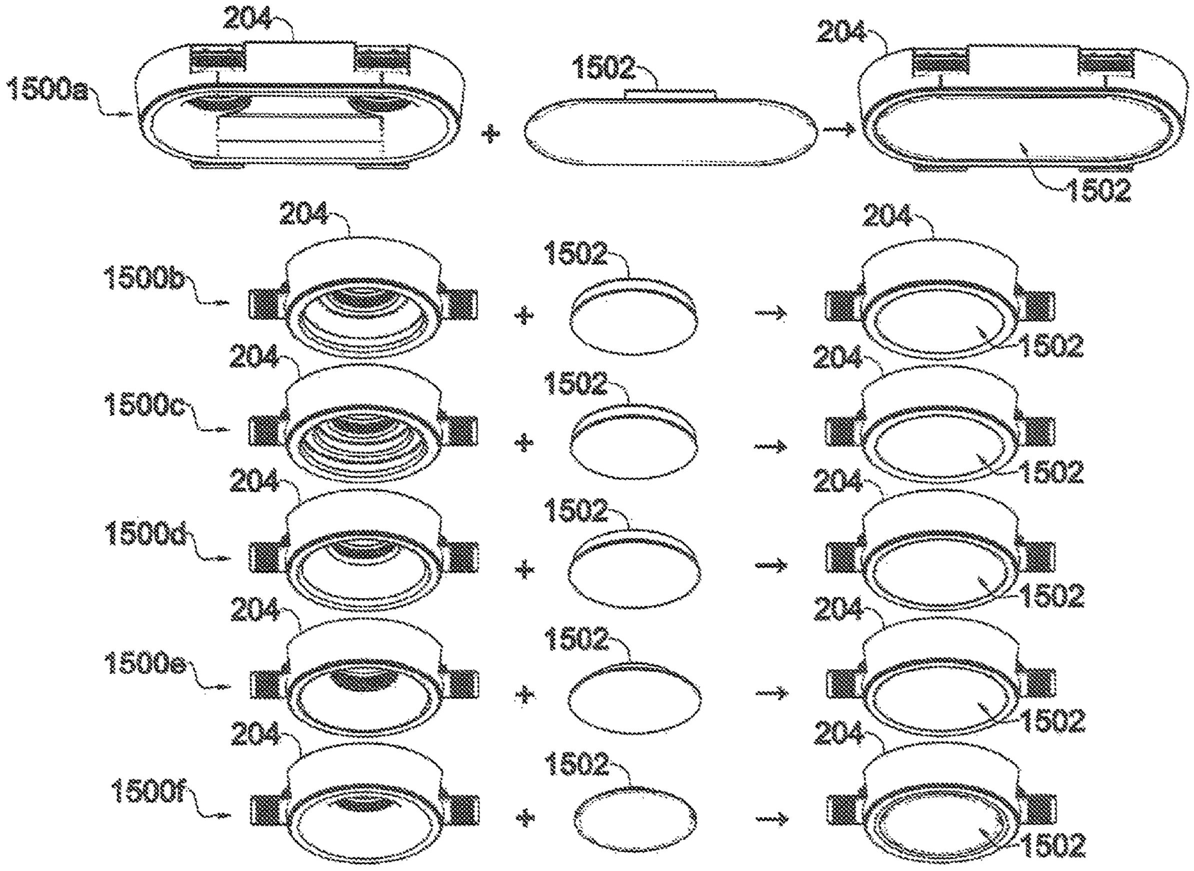
FIG. 15B shows various example designs for protective materials.

In various cases, as best shown in FIG. 15B, similar to the reflector 302, the protective cap 502 may have a shape and profile design that complements, or matches, the cross-sectional profile of the light passage 216. For example, the cap 1502 may have a generally curved convex profile, a linear tapered profile, a curved concave profile, a stepped profile or a partially tapered profile (see e.g., 1500*b*-1500*f* in FIG. 15B). The cap 1502 may also be configured for fitting into concrete structures having multiple light passage openings (1500*a* in FIG. 15B). At 1206, electrical conduits 1306 (e.g., electrical tubes) are connected to the junction box 202, e.g., via the punch-out holes 202*e*.

At 1208, the openable lid 206 of the junction box 202 may be secured in the closed position after ensuring that all connections are fastened tightly to the junction box 202.

Figure 14:
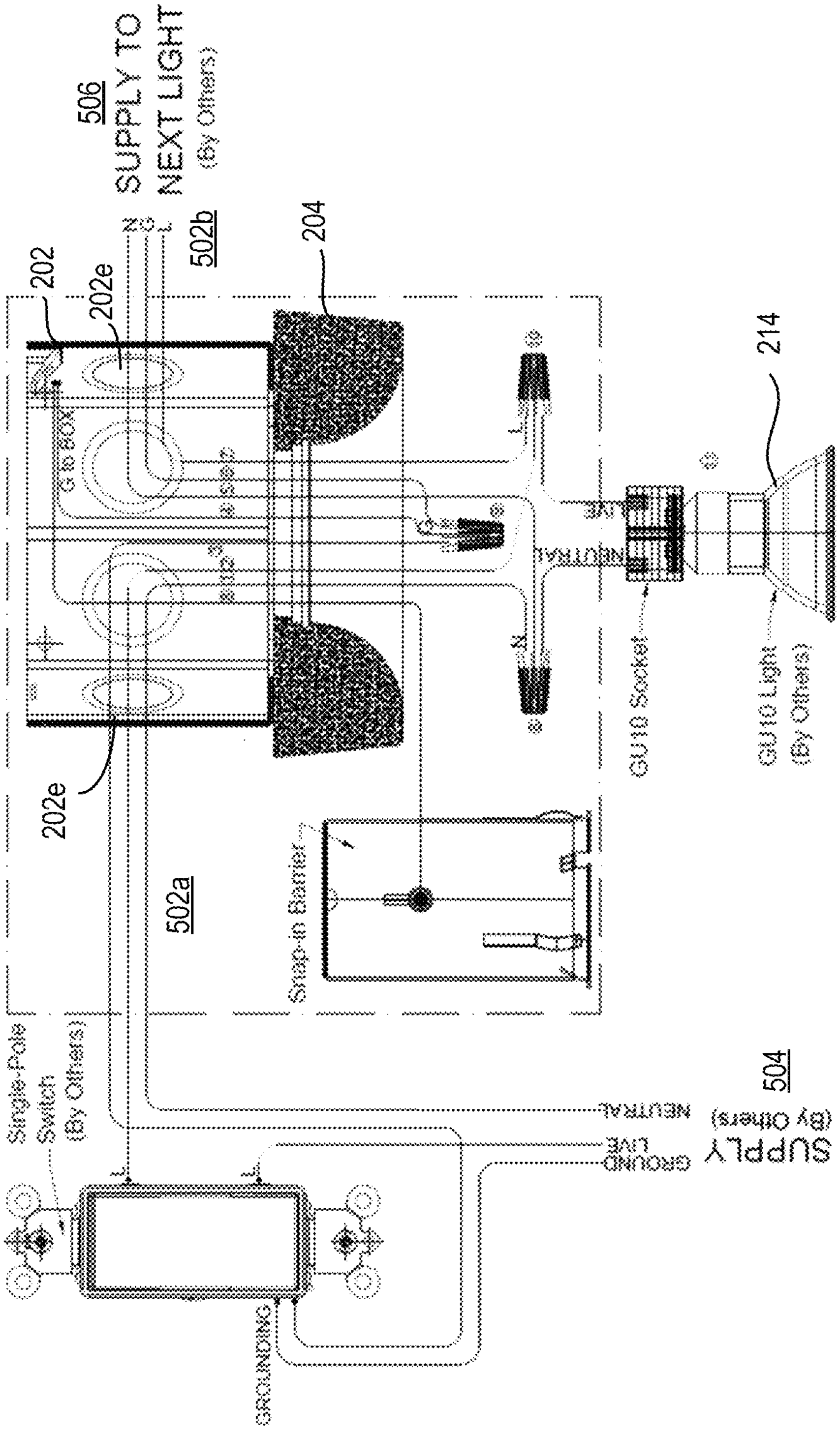
FIG. 14 is an illustration of an electrical wiring configuration for operating a light emitter.

At 1210, structural elements of the concrete framework structure are applied. For example, this can involve installing top and additional rebar layers 1308 may be installed. At 1212, the concrete layers 1310 may be poured to generate a concrete structure (or a finished concrete structure). At 1214, after a curing period, the formwork layer 1302 may be removed from the concrete structure, and the brackets 1310 may be disconnected. At 1216, external wires can be fished through the electrical conduits 1306 and into the junction box 202, via the punch-out holes 202*e* (FIG. 14).

Figure 3B:
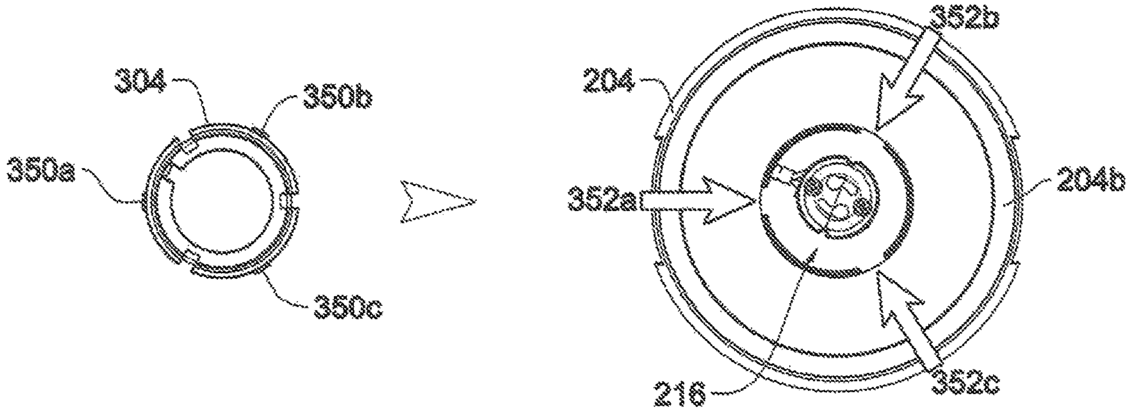
FIGS. 3B and 3C illustrate an example process for inserting a snap-in barrier through a bottom surface of a concrete structure.

At 1218, the light emitter 214 may be connected through the light passage 216 and connected to a lamp holder inside the junction box 202. In some examples, as best shown in FIG. 3B, the snap-in barrier 304 can be inserted prior to connecting the light emitter 214. For example, the snap-in barrier 304 can be inserted, axially, through a bottom end 204*b* of the concrete structure 204.

Figure 3C:
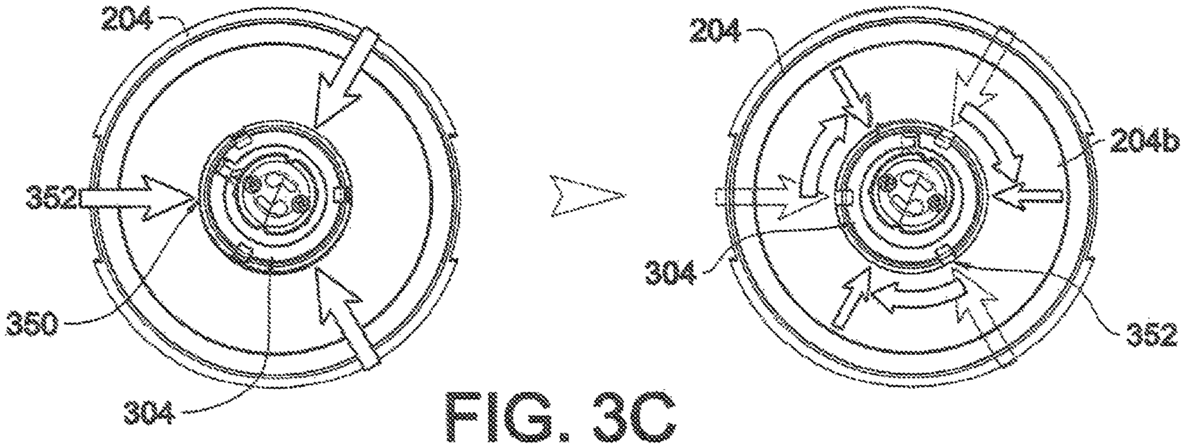

As shown, in FIGS. 3B and 3C, in some examples, a securing mechanism assists in securing the snap-in barrier 304 inside the concrete structure 204. For example, the securing mechanisms is located on a bottom end 304*b* of the barrier 304 (FIG. 3A). The securing mechanisms can include one or more notch flaps 350*a*-350*c*. The notch flaps 350 are receivable inside of complementary openings 352*a*-352*c*, formed within the concrete structure 204. That is, openings 352 can be formed within an inner radial area of concrete structure 204, surrounding passage 216.

In an assembled state, the snap-in barrier 304 is inserted through the passage 216, with the notch flaps 350 axially aligned with the complementary openings 352 (FIG. 3C). In this position, the top end 304*a* of the snap-in barrier 304 is disposed within the junction box 202. The snap-in barrier 304 is then rotated (e.g., clockwise or counter clockwise), to axially misalign the notch flaps 350 relative to the openings 352. For example, the notch flaps 350 can slide clockwise or counter clockwise within an internal track formed within the base structure. In doing so, the snap-in barrier 304 is locked into place, relative to the concrete base structure 204.

Accordingly, once installed, the luminaire 200 is permanently embedded into the concrete structure with only the bottom side of the concrete structure being exposed.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A recessed concrete luminaire installed inside a recess formed in a concrete mounting structure, the concrete mounting structure having an exposed surface that is flush with at least one of a ceiling, a floor, or at least one side wall of a building structure, the recessed concrete luminaire comprising:

a) at least one junction box defining a housing for retaining at least one light emitter and corresponding electrical hardware components; and b) a concrete base structure made of concrete and secured to the at least one junction box, the concrete base structure having a first side connected to the at least one junction box and an opposed second side, the concrete base structure further comprising at least one light opening passage having a corresponding profile shape extending between the first and the second sides, wherein, in an installed position, the at least one light emitter is spaced from the second side of the concrete base structure such that light from the at least one light emitter passes through the profile shape of the corresponding at least one light opening passage through the concrete base structure, and wherein, in the installed position, the recessed concrete luminaire is irremovably embedded inside the recess formed in the concrete mounting structure, the second side of the concrete base structure is exposed outside of the recess and is flush with the exposed surface of the concrete mounting structure, and the at least one light emitter is accessible from the corresponding at least one light opening passage of the concrete base structure.

2. The recessed light fixture of claim 1, wherein, prior to installation, the concrete is poured into a mold with a predetermined shape to form the concrete base structure having the at least one light opening passage with the corresponding profile shape.

3. The recessed light fixture of claim 2, further comprising a reflector positioned inside of the at least one light opening passage of the concrete base structure.

4. The recessed light fixture of claim 3, wherein a shape of the reflector is complementary to the profile shape of the corresponding at least one light opening passage in the concrete base structure so that the at least one light opening passage can receive the reflector.

5. The recessed light fixture of claim 2, wherein the profile shape is one or more of a frustoconical profile, a stepped profile, a bell shape or a cylindrical profile.

6. The recessed light fixture of claim 1, further comprising one or more retention mechanisms connected to the concrete base structure, the retention mechanisms securing the recessed concrete luminaire inside the concrete mounting structure in the mounted position.

7. The recessed light fixture of claim 6, wherein the one or more retention mechanisms comprise steel brackets.

8. The recessed light fixture of claim 1, wherein the concrete base structure is reinforced by one or more of steel wire and polypropylene fiber for increased structural integrity.

9. The recessed light fixture of claim 1, wherein each of the at least one junction box further comprises one or more punch-out holes for receiving external wiring, and in the installed position, the punch-out holes are aligned with an electrical conduit layer inside the concrete mounting structure.

10. The recessed light fixture of claim 1, wherein the at least one junction box comprises a plurality of junction boxes, each junction box having a corresponding light emitter, and wherein the concrete base structure comprises a corresponding number of light opening passages.

11. The recessed light fixture of claim 1, wherein the concrete base structure has a lateral surface that extends between the first and the second sides, and a cove groove extends into the lateral surface along the second side, the cove groove being configured to receive a fillable material and to act as a cold joint in the mounted position.

12. A method for installing a recessed concrete luminaire comprising:

securing the luminaire to a formwork layer of a concrete framework structure, the luminaire comprising:

at least one junction box defining a housing for retaining at least one light emitter and corresponding electrical hardware components; and a concrete base structure made of concrete and secured to the at least one junction box, the concrete base structure having a first side connected to the at least one junction box and an opposed second side, the concrete base structure further comprising at least one light opening passage having a corresponding profile shape extending between the first and the second sides, wherein the at least one light opening passage is aligned with a corresponding at least one hole in the formwork layer;

applying structural elements to the concrete framework structure;

pouring concrete material in the concrete framework structure to form a concrete mounting structure;

wherein in an installed position, the at least one light emitter is spaced from the second side of the concrete base structure such that light from the at least one light emitter passes through the profile shape of the corresponding at least one light opening passage through the concrete base structure, and the luminaire is irremovably embedded inside of a recess formed in the concrete mounting structure, and the second side of the concrete base structure is exposed outside of the recess and is flush with an exposed surface of the concrete mounting structure, and the at least one light emitter is accessible from the corresponding at least one light opening passage of the concrete base structure.

13. The method of claim 12, wherein applying the structural elements comprises installing one or more reinforcement bar layers.

14. The method of claim 13, wherein installing the reinforcement bar layers comprises bending one or more reinforcement bars to avoid interference with the luminaire.

15. The method of claim 13, wherein installing the reinforcement bar layers comprises cutting one or more of the reinforcement bars to avoid interference with the luminaire, and installing one or more additional reinforcement bars.

16. The method of claim 12, wherein the formwork layer comprises plywood.

17. The method of claim 12, wherein after pouring the concrete material, the formwork layer is removed.

18. The method of claim 12, wherein prior to securing the luminaire to the formwork layer, the method further comprises: installing the electrical hardware components inside a junction box cavity.

19. The method of claim 12, wherein prior to applying structural elements to the concrete framework structure, the method further comprises: connecting electrical conduits to the at least one junction box via punch-out holes on the at least one junction box, and securing a top lid of the at least one junction box in the closed position.

20. The method of claim 12, wherein the concrete framework structure is in one of a vertical or horizontal orientation.

* * * * *